United States Patent
Jiang et al.

(10) Patent No.: US 11,418,283 B2
(45) Date of Patent: Aug. 16, 2022

(54) BLIND DETECTION PARAMETER ACQUISITION METHOD, RELEVANT DEVICE AND SYSTEM

(71) Applicant: VIVO MOBILE COMMUNICATION CO., LTD., Chang'an Dongguan (CN)

(72) Inventors: Dajie Jiang, Chang'an Dongguan (CN); Lei Jiang, Chang'an Dongguan (CN); Fei Qin, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 251 days.

(21) Appl. No.: 16/632,495

(22) PCT Filed: Jun. 28, 2018

(86) PCT No.: PCT/CN2018/093321
§ 371 (c)(1),
(2) Date: Jan. 20, 2020

(87) PCT Pub. No.: WO2019/015457
PCT Pub. Date: Jan. 24, 2019

(65) Prior Publication Data
US 2020/0204292 A1    Jun. 25, 2020

(30) Foreign Application Priority Data
Jul. 20, 2017    (CN) .................... 201710616857.X

(51) Int. Cl.
*H04L 1/00*        (2006.01)
*H04W 52/02*    (2009.01)
*H04W 72/04*    (2009.01)

(52) U.S. Cl.
CPC ....... *H04L 1/0038* (2013.01); *H04W 52/0229* (2013.01); *H04W 52/0235* (2013.01); *H04W 72/042* (2013.01)

(58) Field of Classification Search
CPC .... H04L 1/0038; H04L 1/00; H04W 52/0229; H04W 52/0235; H04W 72/042; H04W 8/24; H04W 52/0225; Y02D 30/70
See application file for complete search history.

(56) References Cited

U.S. PATENT DOCUMENTS

2012/0275364 A1    11/2012    Anderson et al.
2016/0119216 A1    4/2016    Zuo et al.
(Continued)

FOREIGN PATENT DOCUMENTS

CN    102104666 A    6/2011
CN    103298123 A    9/2013
(Continued)

OTHER PUBLICATIONS

First Chinese Office Action Application No. 201710616857.X; dated Dec. 2, 2019.
(Continued)

*Primary Examiner* — Kyaw Z Soe
(74) *Attorney, Agent, or Firm* — von Briesen & Roper, s.c.

(57) ABSTRACT

A blind detection parameter acquisition method, a relevant device and a system are provided. The blind detection parameter acquisition method includes: detecting a signal or a channel to acquire a detection result; and acquiring a blind detection parameter corresponding to the detection result. The signal includes a wake-up signal or a go-to-sleep signal, and the channel includes a wake-up channel or a go-to-sleep channel.

20 Claims, 8 Drawing Sheets

(56) References Cited

U.S. PATENT DOCUMENTS

| | | |
|---|---|---|
| 2016/0254901 A1 | 9/2016 | You et al. |
| 2017/0079019 A1* | 3/2017 | Yang ................. H04L 1/1671 |
| 2017/0202055 A1* | 7/2017 | Feuersaenger ...... H04L 27/2602 |
| 2020/0145921 A1* | 5/2020 | Zhang ............... H04W 52/0229 |
| 2020/0383054 A1* | 12/2020 | Tang ................. H04W 76/28 |

FOREIGN PATENT DOCUMENTS

| | | |
|---|---|---|
| CN | 104219036 A | 12/2014 |
| CN | 102612849 B | 8/2015 |
| CN | 104869578 A | 8/2015 |
| WO | WO 2015/130005 A1 | 9/2015 |

OTHER PUBLICATIONS

Second Chinese Office Action Application No. 201710616857 X; dated Mar. 23, 2020.
International Search Report & Written Opinion related to Application No. PCT/CN2018/093321; dated Sep. 18, 2018.
VIVO; "Remaining issues for wake-up signal for efeMTC", 3GPP TSG RAN WG1 Meeting #90bis, R1-1717456, Prague, Czech Republic, Oct. 9, 2017-Oct. 13, 2017.
Interdigital Inc.; "Power Savings for Carrier Aggregation in NR", 3GPP TSG-RAN WG2 NR AH#2, R2-1706684, Qingdao, P.R. China, Jun. 27, 2017-Jun. 29, 2017.
European Search Report Application No. 18834827.0; dated Jun. 26, 2020.
Qualcomm Incorporated; "UE Power Evaluation for DRX with Wake-Up Signaling"; 3GPP TSG-RAN WG1 NR AdHoc; R1-1700820; Jan. 16, 2017-Jan. 20, 2017; Spokane, USA.

* cited by examiner

BLIND DETECTION PARAMETER ACQUISITION METHOD, RELEVANT DEVICE AND SYSTEM

CROSS-REFERENCE TO RELATED APPLICATION

This patent application is a 35 USC § 371 U.S. national stage of International Application No. PCT/CN2018/093321 filed on Jun. 28, 2018, which claims a priority of Chinese Patent Application No. 201710616857.X filed on Jul. 20, 2017, which is incorporated herein by reference in its entirety.

TECHNICAL FIELD

The present disclosure relates to the field of communication technology, in particular to a blind detection parameter acquisition method, a relevant device and a system.

BACKGROUND

In a communication system, in some scenarios blind detection is performed by a User Equipment (UE) on a signal from a base station, e.g., a Physical Downlink Control Channel (PDCCH), so as to acquire a PDCCH signal from the base station. However, currently the maximum number of blind detection UE needs to perform is 44, so the complexity of the blind detections is very high, resulting in serious power consumption for the UE.

SUMMARY

In one aspect, the present disclosure provides in some embodiments a blind detection parameter acquisition method applied for a UE, including: detecting a signal or a channel to acquire a detection result; and acquiring a blind detection parameter corresponding to the detection result, wherein the signal comprises a wake-up signal or a go-to-sleep signal, and the channel comprises a wake-up channel or a go-to-sleep channel.

In another aspect, the present disclosure provides in some embodiments a blind detection parameter acquisition method applied for a base station, including: determining a blind detection parameter for a UE; and transmitting a signal to the UE or transmitting a signal to the UE via a channel, so that the UE detects the signal or the channel to acquire a detection result and acquires the blind detection parameter corresponding to the detection result, wherein the signal comprises a wake-up signal or a go-to-sleep signal, the channel comprises a wake-up channel or a go-to-sleep channel, and the signal or the signal payload transmitted via the channel both correspond to the blind detection parameter.

In yet another aspect, the present disclosure provides in some embodiments a UE, including: a detection module configured to detect a signal or a channel to acquire a detection result; and an acquisition module configured to acquire a blind detection parameter corresponding to the detection result. The signal includes a wake-up signal or a go-to-sleep signal, and the channel includes a wake-up channel or a go-to-sleep channel.

In still yet another aspect, the present disclosure provides in some embodiments a base station, including: a determination module configured to determine a blind detection parameter of a UE; and a transmission module configured to transmit a signal to the UE or transmitting a payload to the UE via a channel, so that the UE detects the signal or the channel to acquire a detection result and acquires the blind detection parameter corresponding to the detection result. The signal includes a wake-up signal or a go-to-sleep signal, and the channel includes a wake-up channel or a go-to-sleep channel. The signal or the payload both correspond to the blind detection parameter.

In still yet another aspect, the present disclosure provides in some embodiments a UE, including a memory, a processor and a computer program stored in the memory and executed by the processor. The processor is configured to execute the computer program so as to implement the above-mentioned blind detection parameter acquisition method for the UE.

In still yet another aspect, the present disclosure provides in some embodiments a base station, including a memory, a processor and a computer program stored in the memory and executed by the processor. The processor is configured to execute the computer program so as to implement the above-mentioned blind detection parameter acquisition method for the base station.

In still yet another aspect, the present disclosure provides in some embodiments a computer-readable storage medium storing therein a computer program. The computer program is executed by a processor so as to implement the above-mentioned blind detection parameter acquisition method for the UE.

In still yet another aspect, the present disclosure provides in some embodiments a computer-readable storage medium storing therein a computer program. The computer program is executed by a processor so as to implement the above-mentioned blind detection parameter acquisition method for the base station.

In still yet another aspect, the present disclosure provides in some embodiments a blind detection parameter acquisition system including the above-mentioned UE and base station.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
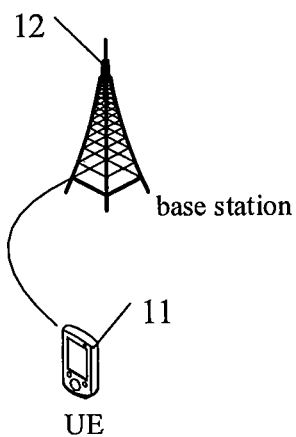
FIG. 1 is a schematic view of a blind detection parameter acquisition system according to one embodiment of the present disclosure.

FIG. 1 shows a blind detection parameter acquisition system according to one embodiment of the present disclosure. As shown in FIG. 1, the blind detection parameter acquisition system includes a UE 11 and a base station 12. The UE 11 may be a terminal side device such as a mobile phone, a tablet personal computer, a laptop computer, a Personal Digital Assistant (PDA), a Mobile Internet Device (MID) or a wearable device. It should be appreciated that, the types of the UE 11 will not be particularly defined herein. The base station 12 may be a $5^{th}$-Generation (5G) base station (e.g., gNB, 5G New Radio (NR) Node B (NB)), or a $4^{th}$-Generation (4G) base station (e.g., an evolved Node B (eNB)), or a $3^{rd}$-Generation (3G) base station (e.g., NB). It should be appreciated that, the types of the base station 12 will not be particularly defined herein.

It should be appreciated that, functions of the UE 11 and the base station 12 will be described hereinafter in conjunction with the embodiments.

Figure 2:
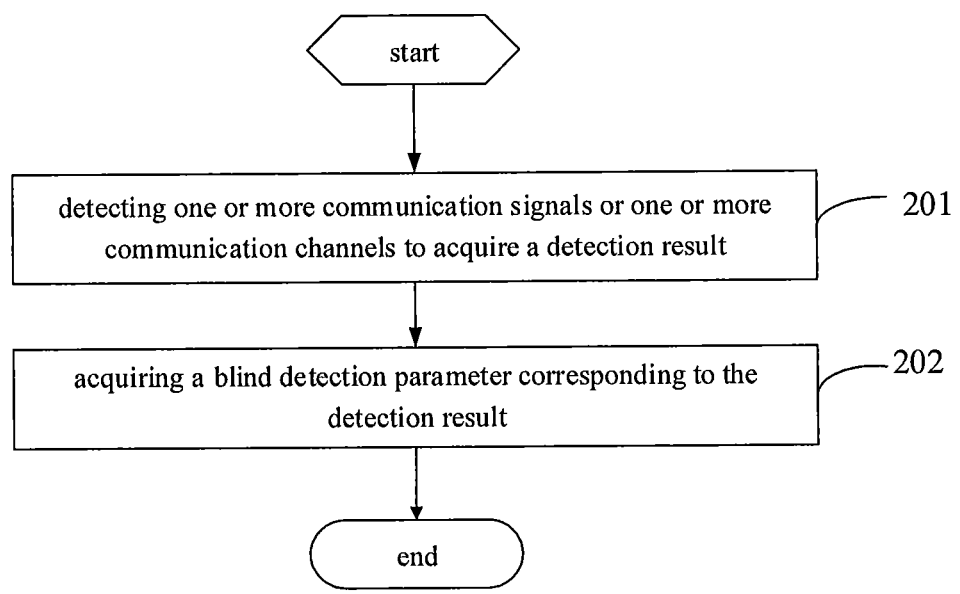
FIG. 2 is a flow chart of a blind detection parameter acquisition method according to one embodiment of the present disclosure.

The present disclosure provides in some embodiments a blind detection parameter acquisition method for a UE which, as shown in FIG. 2, includes the following steps.

Step 201: detecting a signal or a channel to acquire a detection result.

This detection step may include detecting energy, electrical level, sequence content, payload or indication information of a wake-up signal (WUS) or a go-to-sleep signal, so as to acquire a corresponding detection result, In addition, the detection on the channel may include detecting the payload transmitted by a base station via the channel, which however will not be particularly defined herein.

Step 202: acquiring a blind detection parameter corresponding to the detection result.

The signal may include a WUS or a go-to-sleep signal, and the channel may include a wake-up channel or a go-to-sleep channel.

The wake-up channel may be a channel via which the WUS is transmitted, and the go-to-sleep channel may be a channel via which the go-to-sleep signal is transmitted. In a possible embodiment of the present disclosure, these two channels may belong to a same channel. In addition, the WUS or the go-to-sleep signal may be transmitted by the base station.

The acquiring the blind detection parameter corresponding to the detection result may include: acquiring the blind detection parameter indicated by the detection result, or acquiring the blind detection parameter included in the detection result, which will not be particularly defined herein. In addition, the blind detection parameter may include a blind detection parameter of a PDCCH. Of course, the blind detection parameter in the embodiments of the present disclosure shall not be limited thereto, and it may also include a blind detection parameter of any other channel.

According to the embodiments of the present disclosure, through detecting the signal or the channel, it is able to acquire the corresponding blind detection parameter, thereby to reduce the times of blind detection operations made by the UE, and reduce the power consumption for the blind detection operations made by the UE.

In the embodiments of the present disclosure, the signal or the channel may be detected so as to acquire the detection result, and then the blind detection parameter corresponding to the detection result may be acquired. The signal may include the WUS or the go-to-sleep signal, and the channel may include the wake-up channel or the go-to-sleep channel. As a result, it is able to flexibly acquire the blind detection parameter through the signal or channel, thereby to reduce the times of the blind detection operations, and reduce the power consumption for the UE.

Figure 3:
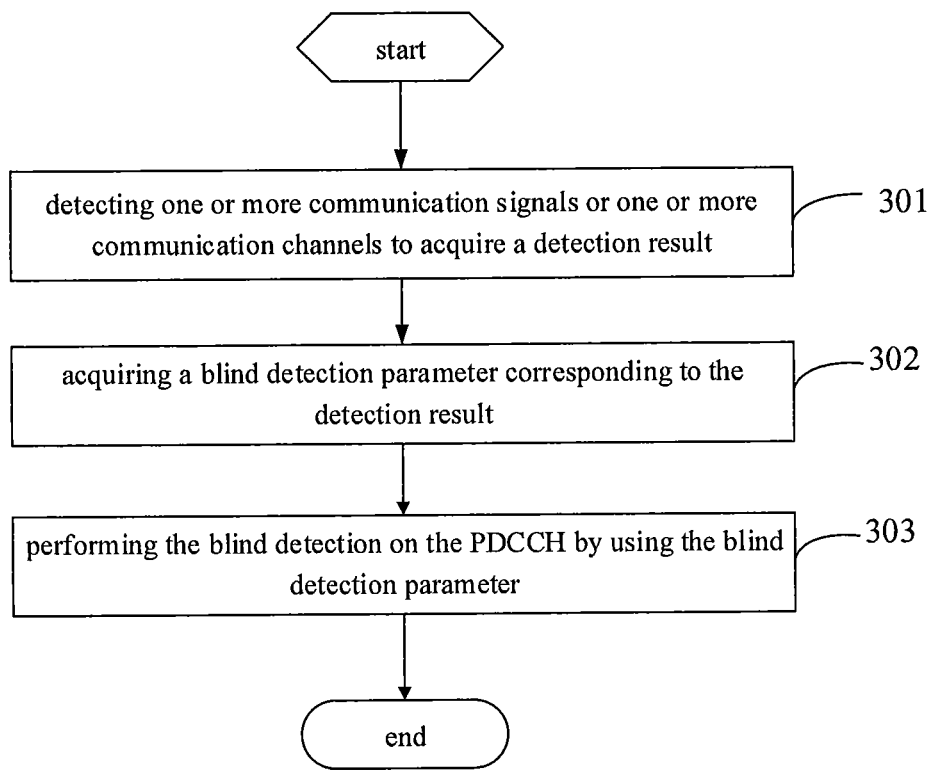
FIG. 3 is another flow chart of the blind detection parameter acquisition method according to one embodiment of the present disclosure.

As shown in FIG. 3, the present disclosure further provides in some embodiments a blind detection parameter acquisition method for a UE. The blind detection parameter acquisition method in FIG. 3 differs from that in FIG. 2 mainly in an additional step of performing blind detection on the PDCCH in accordance with the blind detection parameter. As shown in FIG. 3, the blind detection parameter acquisition method may include the following steps.

Step 301: detecting a signal or a channel to acquire a detection result.

This detection step may include detecting energy, electrical level, sequence content, payload or indication information of a WUS or a go-to-sleep signal, so as to acquire a corresponding detection result.

Step 302: acquiring a blind detection parameter corresponding to the detection result.

The signal may include a WUS or a go-to-sleep signal, and the channel may include a wake-up channel or a go-to-sleep channel.

In the embodiments of the present disclosure, when the go-to-sleep channel has not been detected or a signal of 0 has been detected, it means that the go-to-sleep signal has been detected.

In the embodiments of the present disclosure, the blind detection parameter corresponding to the detection result may be a blind detection parameter indicated in a pre-acquired correspondence between detection results and blind detection parameters, or a blind detection parameter indicated in the indication information of the detection result, which will not be particularly defined herein.

In a possible embodiment of the present disclosure, the blind detection parameter may include a blind detection parameter of a PDCCH.

According to the embodiments of the present disclosure, it is able to acquire the blind detection parameter of the PDCCH through the WUS or the go-to-sleep signal, thereby to reduce the times of the blind detection operations on the PDCCH, and reduce the power consumption for the UE.

In a possible embodiment of the present disclosure, the detecting a signal or the channel to acquire the detection result may include detecting a state of the signal or the channel, so as to acquire a state detection result. The signal or the channel may be transmitted in an on-off keying (OOK) manner.

The state detection may include detecting an on-state or an off-state of the signal or the channel. For example, the state may be detected in accordance with noncorrelated energy or electrical level. When the energy or electrical level is non-zero, the signal or channel may be determined to be in the on-state, and when the energy or electrical level is zero, it may be determined to be in the off-state. In addition, the WUS or go-to-sleep signal here may be a signal corresponding to OOK, i.e., the WUS or go-to-sleep signal may be represented by the signal corresponding to OOK. Of course, the signal corresponding to OOK may also be used to represent a payload.

In the embodiments of the present disclosure, the blind detection parameter indicated in the state detection result may be acquired in accordance with the state detection result. For example, when the state detection result indicates the on-state, the blind detection parameter may include an aggregation level 1, a common search space and a Downlink Control Information (DCI) format 1. In this way, it is unnecessary to transmit any additional signal between the UE and the base station when acquiring the blind detection parameter. In addition, it is able to indicate the corresponding blind detection parameter without any necessity to carry any additional information in the WUS or the go-to-sleep signal, thereby to reduce the transmission overhead and save the transmission resources.

In a possible embodiment of the present disclosure, subsequent to detecting the state of the signal or the channel so as to acquire the state detection result, the blind detection parameter acquisition method may further include, if the state detection result indicates the on-state, performing the blind detection on the PDCCH, and if the state detection result indicates the off-state, maintaining a go-to-sleep state.

In the embodiments of the present disclosure, when the state detection result indicates the on-state, the blind detection on the PDCCH may be performed subsequently, i.e., the PDCCH may be received. When the state detection result indicates the off-state, the go-to-sleep state may be maintained. Specifically, the UE may be in the go-to-sleep state continuously, i.e., it may be in the go-to-sleep state before the reception of the WUS or the go-to-sleep signal. In a possible embodiment of the present disclosure, when the state detection result indicates the on-state, it may represent that the WUS has been received, and when the state detection result indicates the off-state, it may represent that the go-to-sleep signal has been received or no signal has been received, because at this time the energy or electrical level may be 0 as indicated in the detection result.

In the embodiments of the present disclosure, it is able to wake up the UE in time or maintain the UE to be in the go-to-sleep state in accordance with the state detection result, so as to reduce the power consumption for the UE.

In a possible embodiment of the present disclosure, the detecting the state of the signal or the channel so as to acquire the state detection result may include: detecting the state of the signal or the channel on at least one resource unit, so as to acquire the state detection result. The state detection result may include a result acquired by the state detection on the at least one resource unit. The acquiring the blind detection parameter corresponding to the detection result may include acquiring the blind detection parameter corresponding to the state detection result as well as a detection-state corresponding to the state detection result, and the detection-state may include a wake-up state or a go-to-sleep state.

Through the state detection on the at least one resource unit, it is able to acquire at least one state detection result, i.e., each detection result may be acquired on each resource unit. Then, the blind detection parameter indicated in the at least one detection result may be determined. In addition, when determining the blind detection parameter, whether the UE is in the wake-up state or the go-to-sleep state may be determined, i.e., two blind detection parameters and whether the UE is in the wake-up state or the go-to-sleep state may be determined through one detection operation, so it is able to save the transmission resources.

For example, the state detection result may correspond to an aggregation level of PDCCH, so as to further reduce the power consumption for the UE during the blind detection on the PDCCH. The WUS or go-to-sleep signal may be transmitted in an OOK manner on two resource units. When the on-state has been detected by the UE on the two resource units, it means that an aggregation level of PDCCH to be detected by the UE is 4 or 8, and at this time the UE may perform the blind detection in accordance with this information. Of course, when the blind detection is performed unsuccessfully, the UE may try to perform the blind detection in accordance with the other aggregation level. When the UE has detected the on-state and the off-state sequentially on the two resource units, it means that the aggregation level of PDCCH is 2, and at this time the UE may perform the blind detection in accordance with this information. Of course, when the blind detection is performed unsuccessfully, the UE may try to perform the blind detection in accordance with the other aggregation level. When the UE has detected the off-state and the on-state sequentially on the two resource units, it means that the aggregation level of PDCCH is 1, and at this time the UE may perform the blind detection in accordance with this information. Of course, when the blind detection is performed unsuccessfully, the UE may try to perform the blind detection in accordance with the other aggregation level. When the UE has detected the off-state sequentially on the two resource units, it is unnecessary for the UE to perform the blind detection on a paging signal or the PDCCH, and the UE may be maintained in the go-to-sleep state. In other words, when the off-state has been detected sequentially on the two resource units, it means that the go-to-sleep signal has been received, and when the states include at least one on-state, it means that the WUS signal has been received.

For another example, the state detection result may correspond to a type of a search space to be detected by the UE, so as to further reduce the power consumption for the UE during the blind detection on the PDCCH. The WUS or the go-to-sleep signal may be transmitted in an OOK manner on two resource units. When the on-state has been detected on the two resource units, it means that a search space to be detected by the UE may be a search space 1 (e.g., a common search space), and at this time the UE may perform the blind detection in accordance with this information. When the blind detection is performed unsuccessfully, the UE may try to perform the blind detection in accordance with the other search space. When the on-state and the off-state have been detected sequentially on the two resource units, it means that the search space to be detected by the UE is a search space 2 (e.g., a UE-specific search space 1), and at this time the UE may perform the blind detection in accordance with this information. When the blind detection is performed unsuccessfully, the UE may try to perform the blind detection in accordance with the other search space. When the off-state and the on-state have been detected by the UE sequentially on the two resource units, it means that the search space to be detected by the UE is a search space 3 (e.g., a UE-specific search space 2), and at this time the UE may perform the blind detection in accordance with this information. When the blind detection is performed unsuccessfully, the UE may try to perform the blind detection in accordance with the other search space. When the off-state has been detected by the UE on the two resource units, it is unnecessary for the UE to perform the blind detection on the paging signal or the PDCCH, and the UE may be maintained in the go-to-sleep state.

For yet another example, the state detection result may correspond to a DCI format to be detected by the UE, so as to further reduce the power consumption for the UE during the blind detection on the PDCCH. The WUS or go-to-sleep signal may be transmitted in an OOK manner on two resource units. When the UE has detected the on-state on the two resource units, it means that the DCI format to be detected by the UE is a DCI format 1, and at this time, the UE may perform the blind detection in accordance with this information. When the blind detection is performed unsuccessfully, the UE may try to perform the blind detection on the other DCI format. When the UE has detected the on-state and the off-state sequentially on the two resource units, it means that the DCI format to be detected by the UE is a DCI format 3, and at this time the UE may perform the blind detection in accordance with this information. When the blind detection is performed unsuccessfully, the UE may try to perform the blind detection on the other DCI format. When the UE has detected the off-state and the on-state sequentially on the two resource units, it means that the DCI format to be detected by the UE is the DCI format 1 and the DCI format 3, and at this time the UE may perform the blind detection in accordance with this information. When the blind detection is performed unsuccessfully, the UE may try to perform the blind detection on the other DCI format. When the UE has detected the off-state sequentially on the two resource unit, it is unnecessary for the UE to perform the blind detection on the paging signal or PDCCH, and the UE may be maintained in the go-to-sleep state.

For still yet another example, the state detection result may correspond to bandwidth parts to be detected by the UE, so as to further reduce the power consumption for the UE during the blind detection on the PDCCH. The WUS or go-to-sleep signal may be transmitted in an OOK manner on two resource units. When the UE has detected the on-state on the two resource units, it means that the bandwidth parts to be detected by the UE is bandwidth part 1, and at this time the UE may perform the blind detection in accordance with this information. When the blind detection is performed unsuccessfully, the UE may try to perform the blind detection on the other bandwidth parts. When the UE has detected the on-state and the off-state sequentially on the two resource units, it means that the bandwidth parts to be detected by the UE is bandwidth part 2, and at this time the UE may perform the blind detection in accordance with this information. When the blind detection is performed unsuccessfully, the UE may try to perform the blind detection on the other bandwidth parts. When the UE has detected the off-state and the on-state sequentially on the two resource units, it means that the bandwidth part to be detected by the UE is a bandwidth part 3, and at this time the UE may perform the blind detection in accordance with this information. When the blind detection is performed unsuccessfully, the UE may try to perform the blind detection on the other bandwidth parts. When the UE has detected the off-state on the two resource units, it is unnecessary for the UE to perform the blind detection on the paging signal or the PDCCH, and the UE may be maintained in the go-to-sleep state.

For still yet another example, the state detection result may correspond to a time-frequency-domain resource to be detected by the UE, so as to further reduce the power consumption for the UE during the blind detection on the PDCCH. The WUS or go-to-sleep signal may be transmitted in an OOK manner on two resource units. When the UE has detected the on-state on the two resource units, it means that the time-frequency-domain resource to be detected by the UE may be a first Orthogonal Frequency Division Multiplexing (OFDM) symbol within a sub-frame where the WUS or go-to-sleep signal is located, and at this time the UE may perform the blind detection in accordance with this information. When the blind detection is performed unsuccessfully, the UE may try to perform the blind detection on the other OFDM symbol (or the other group of OFDM symbols). When the UE has detected the on-state and the off-state sequentially on the two resource units, it means that the time-frequency-domain resource to be detected by the UE is first two OFDM symbols within the sub-frame where the WUS or the go-to-sleep signal is located, and at this time the UE may perform the blind detection in accordance with this information. When the blind detection is performed unsuccessfully, the UE may try to perform the blind detection on the other OFDM symbol (or the other group of OFDM symbols). When the UE has detected the off-state and the on-state sequentially on the two resource units, it means that the time-frequency-domain resource to be detected by the UE is first three OFDM symbols within the sub-frame where the WUS or the go-to-sleep signal is located, and at this time the UE may perform the blind detection in accordance with this information. When the blind detection is performed unsuccessfully, the UE may try to perform the blind detection on the other OFDM symbol (or the other group of OFDM symbols). When the UE has detected the off-state on the two resource units, it is unnecessary for the UE to perform the blind detection on the paging signal or the PDCCH, and the UE may be maintained in the go-to-sleep state.

For still yet another example, the state detection result may correspond to a time interval between the PDCCH and the corresponding WUS or go-to-sleep signal, so as to further reduce the power consumption for the UE during the blind detection on the PDCCH. The WUS or go-to-sleep signal may be transmitted in an OOK manner on two resource units. When the UE has detected the on-state on the two resource units, it means that the time interval between the PDCCH and the corresponding WUS or go-to-sleep signal to be detected by the UE is X ms, where X is an integer greater than 0. When the UE has detected the on-state and the off-state sequentially on the two resource units, it means that the time interval between the PDCCH and the corresponding WUS or go-to-sleep signal to be detected by the UE is Y ms, where Y is an integer greater than 0. When the UE has detected the off-state and the on-state sequentially on the two resource units, it means that the time interval between the PDCCH and the corresponding WUS or go-to-sleep signal to be detected by the UE is Z ms, where Z is an integer greater than 0. When the UE has detected the off-state on the two resource units, it is unnecessary for the UE to perform the blind detection on the paging signal or the PDCCH, and the UE may be maintained in the go-to-sleep state.

For still yet another example, the state detection result may correspond to a plurality of blind detection parameters (e.g., the aggregation level and the bandwidth parts), so as to further reduce the power consumption for the UE during the blind detection on the PDCCH. The WUS or go-to-sleep signal may be transmitted in an OOK manner on two resource units. When the UE has detected the on-state on the two resource units, it means that the bandwidth parts to be detected by the UE is the bandwidth part 1 and the aggregation level is 1. When the UE has detected the on-state and the off-state sequentially on the two resource units, it means that the bandwidth parts to be detected by the UE is the bandwidth part 1 and the aggregation level is 2. When the UE has detected the off-state and the on-state sequentially on the two resource units, it means that the bandwidth parts to be detected by the UE is the bandwidth part 2 and the aggregation level is 1. When the UE has detected the off-state on the two resource units, it is unnecessary for the UE to perform the blind detection on the paging signal or the PDCCH, and the UE may be maintained in the go-to-sleep state.

In the embodiments of the present disclosure, through detecting the signal or the channel on the at least one resource unit, it is able to acquire one or more corresponding blind detection parameters, thereby to improve the success rate of the blind detection, reduce the times of the blind detection operations, and reduce the power consumption for the UE.

In a possible embodiment of the present disclosure, the detecting the signal or the channel, so as to acquire the detection result may include: detecting a sequence of the signals or the channels, so as to acquire a sequence detection result. The acquiring the blind detection parameter corresponding to the detection result may include: acquiring a blind detection parameter corresponding to the sequence detection result. The signals or the channels may be transmitted in the form of an orthogonal sequence, a quasi-orthogonal sequence, or a random sequence.

The sequence detection may include detecting the signals or the channels through a sequence-related operation, so as to acquire the sequence detection result of the signals or the channels. In addition, in the embodiments of the present disclosure, a length of a signal sequence included in the channel or the signal will not be particularly defined, e.g., 1, 2, 4 or 8 bits.

In the embodiments of the present disclosure, the blind detection parameter may be represented by the sequence of the signals or the channels, so it is able to improve the flexibility of the blind detection parameter, thereby further reduce the times of the blind detection operations.

In a possible embodiment of the present disclosure, subsequent to detecting the sequence of the signals or the channels so as to acquire the sequence detection result, the blind detection parameter acquisition method may further include, when the sequence detection result indicates a predetermined sequence, performing the blind detection on the PDCCH, and when the sequence detection result does not indicate the predetermined sequence, enabling the UE to be maintained in the go-to-sleep state.

The predetermined sequence may be preconfigured for the UE, or a transmission sequence received by the UE from the base station, or a sequence predefined in a protocol, which will not be particularly defined herein. For example, the predetermined sequence may be a sequence M, a ZadeOff-Chu sequence or any other sequence.

In the embodiments of the present disclosure, when the sequence detection result indicates the predetermined sequence, the blind detection on the PDCCH may be performed, i.e., the PDCCH may be received subsequently. Otherwise, the UE may be maintained in the go-to-sleep state. As a result, in the embodiments of the present disclosure, it is able for the UE to receive the PDCCH in time or be maintained in the go-to-sleep state in accordance with the state detection result, thereby to reduce the power consumption for the UE.

For example, the sequence detection result may correspond to the aggregation level of PDCCH, so as to further reduce the power consumption for the UE during the blind detection on the PDCCH. The WUS or go-to-sleep signal may be transmitted in the form of sequence. When the sequence detected by the UE in accordance with the sequence of the WUS or go-to-sleep signal is a sequence 1, it means that the aggregation level of the PDCCH to be detected by the UE is 4 or 8, and at this time the UE may perform the blind detection in accordance with this information. When the blind detection is performed unsuccessfully, the UE may try to perform the blind detection in accordance with the other aggregation levels. When the sequence detected by the UE is a sequence 2, it means that the aggregation level of PDCCH to be detected by the UE is 1 or 2, and at this time the UE may perform the blind detection in accordance with this information. When the blind detection is performed unsuccessfully, the UE may try to perform the blind detection in accordance with the other aggregation level. When the sequence detected by the UE is a sequence 3, it is unnecessary for the UE to perform the blind detection on the paging signal or the PDCCH, and the UE may be maintained in the go-to-sleep state.

For another example, the sequence detection result may correspond to the type of the search space to be detected by the UE, so as to further reduce the power consumption for the UE during the blind detection on the PDCCH. The WUS or go-to-sleep signal may be transmitted in the form of sequence. When the sequence detected by the UE in accordance with the sequence of the WUS or go-to-sleep signal is the sequence 1, it means that the search space to be detected by the UE is a search space 1, and at this time the UE may perform the blind detection in accordance with this information. When the blind detection is performed unsuccessfully, the UE may try to perform the blind detection in accordance with another search space. When the sequence detected by the UE is the sequence 2, it means that the search space to be detected by the UE is a search space 2, and at this time the UE may perform the blind detection in accordance with this information. When the blind detection is performed unsuccessfully, the UE may try to perform the blind detection in accordance with another search space. When the sequence detected by the UE is a sequence 3, it is unnecessary for the UE to perform the blind detection on the paging signal or the PDCCH, and the UE may be maintained in the go-to-sleep state.

For yet another example, the sequence detection result may correspond to the DCI format to be detected by the UE, so as to further reduce the power consumption for the UE during the blind detection on the PDCCH. The WUS or go-to-sleep signal may be transmitted in the form of sequence. When the sequence detected by the UE in accordance with the sequence of the WUS or go-to-sleep signal is the sequence 1, it means that the DCI format to be detected by the UE is a DCI format 1, and at this time the UE may perform the blind detection in accordance with this information. When the blind detection is performed unsuccessfully, the UE may try to perform the blind detection in accordance with another DCI format. When the sequence detected by the UE is the sequence 2, it means that the DCI format to be detected by the UE is a DCI format 3, and at this time the UE may perform the blind detection in accordance with this information. When the blind detection is performed unsuccessfully, the UE may try to perform the blind detection in accordance with another DCI format. When the sequence detected by the UE is a sequence 3, it is unnecessary for the UE to perform the blind detection on the paging signal or the PDCCH, and the UE may be maintained in the go-to-sleep state.

For still yet another example, the sequence detection result may correspond to the bandwidth parts to be detected by the UE, so as to further reduce the power consumption for the UE during the blind detection on the PDCCH. The WUS or go-to-sleep signal may be transmitted in the form of sequence. When the sequence detected by the UE in accordance with the sequence of the WUS or go-to-sleep signal is the sequence 1, it means that the bandwidth parts to be detected by the UE is bandwidth part 1, and at this time the UE may perform the blind detection in accordance with this information. When the blind detection is performed unsuccessfully, the UE may try to perform the blind detection in accordance with another bandwidth parts. When the sequence detected by the UE is the sequence 2, it means that the bandwidth parts to be detected by the UE is bandwidth part 2, and at this time the UE may perform the blind detection in accordance with this information. When the blind detection is performed unsuccessfully, the UE may try to perform the blind detection in accordance with another bandwidth parts. When the sequence detected by the UE is a sequence 3, it is unnecessary for the UE to perform the blind detection on the paging signal or the PDCCH, and the UE may be maintained in the go-to-sleep state.

For still yet another example, the sequence detection result may correspond to the time-frequency-domain resource to be detected by the UE, so as to further reduce the power consumption for the UE during the blind detection on the PDCCH. The WUS or go-to-sleep signal may be transmitted in the form of sequence. When the sequence detected by the UE in accordance with the sequence of the WUS or go-to-sleep signal is the sequence 1, it means that the time-frequency-domain resource to be detected by the UE is a first OFDM symbol within a sub-frame where the WUS or go-to-sleep signal is located, and at this time the UE may perform the blind detection in accordance with this information. When the blind detection is performed unsuccessfully, the UE may try to perform the blind detection on another OFDM symbol (or another group of OFDM symbols). When the sequence detected by the UE is the sequence 2, it means that the time-frequency-domain resource to be detected by the UE is first two OFDM symbols within the sub-frame where the WUS or go-to-sleep signal is located, and at this time the UE may perform the blind detection in accordance with this information. When the blind detection is performed unsuccessfully, the UE may try to perform the blind detection on another OFDM symbol (or another group of OFDM symbols). When the sequence detected by the UE is a sequence 3, it is unnecessary for the UE to perform the blind detection on the paging signal or the PDCCH, and the UE may be maintained in the go-to-sleep state.

For still yet another example, the sequence detection result may correspond to the time interval between the PDCCH and the corresponding WUS or go-to-sleep signal, so as to further reduce the power consumption for the UE during the blind detection on the PDCCH. The WUS or go-to-sleep signal may be transmitted in the form of sequence. When the sequence detected by the UE in accordance with the sequence of the WUS or go-to-sleep signal is the sequence 1, it means that the time interval between the PDCCH and the corresponding WUS or go-to-sleep signal to be detected by the UE is X ms. When the sequence detected by the UE is the sequence 2, it means that the time interval between the PDCCH and the corresponding WUS or go-to-sleep signal to be detected by the UE is Y ms. When the sequence detected by the UE is the sequence 3, it is unnecessary for the UE to perform the blind detection on the paging signal or the PDCCH, and the UE may be maintained in the go-to-sleep state.

For still yet another example, the sequence detection result may correspond to a plurality of blind detection parameters (e.g., the aggregation level and the bandwidth parts), so as to further reduce the power consumption for the UE during the blind detection on the PDCCH. The WUS or go-to-sleep signal may be transmitted in the form of sequence. When the sequence detected by the UE in accordance with the sequence of the WUS or go-to-sleep signal is the sequence 1, it means that the bandwidth parts to be detected by the UE is the bandwidth part 1 and the aggregation level is 1. When the sequence detected by the UE is the sequence 2, it means that the bandwidth parts to be detected by the UE is the bandwidth part 1 and the aggregation level is 2. When the sequence detected by the UE is the sequence 3, it is unnecessary for the UE to perform the blind detection on the paging signal or the PDCCH, and the UE may be maintained in the go-to-sleep state.

In a possible embodiment of the present disclosure, the detecting the signal or the channel so as to acquire the detection result may include: performing an channel decoding operation on a payload of the signal or the channel, so as to acquire a payload detection result. The acquiring the blind detection parameter corresponding to the detection result may include acquiring the blind detection parameter corresponding to the payload detection result.

The transmission in the form of the payload of a digital signal may refer to that a corresponding blind detection parameter is represented by a payload of the encoded signal or channel. The payload detection result may refer to specific bits, i.e., different bits may correspond to different blind detection parameters.

For example, the payload (also called as useful information) detection result may correspond to the aggregation level of PDCCH, so as to further reduce the power consumption for the UE during the blind detection on the PDCCH. The WUS or the go-to-sleep signal may be used to transmit a 2-bit payload. When the detected 2-bit payload is 11, it means that the aggregation level of PDCCH to be detected by the UE is 4 or 8, and at this time the UE may perform the blind detection in accordance with this information. When the blind detection is performed unsuccessfully, the UE may try to perform the blind detection in accordance with another aggregation level. When the detected 2-bit payload is 10, it means that the Aggregation level of PDCCH to be detected by the UE is 2, and at this time the UE may perform the blind detection in accordance with this information. When the blind detection is performed unsuccessfully, the UE may try to perform the blind detection in accordance with another aggregation level. When the detected 2-bit payload is 01, it means that the Aggregation level of PDCCH to be detected by the UE is 1, and at this time the UE may perform the blind detection in accordance with this information. When the blind detection is performed unsuccessfully, the UE may try to perform the blind detection in accordance with another aggregation level. When the detected 2-bit payload is 00, it is unnecessary for the UE to perform the blind detection on the paging signal or the PDCCH, and the UE may be maintained in the go-to-sleep state.

For another example, the payload detection result may correspond to the type of the search space to be detected by the UE, so as to further reduce the power consumption for the UE during the blind detection on the PDCCH. The WUS or the go-to-sleep signal may be used to transmit a 2-bit payload. When the detected 2-bit payload is 11, it means that the search space to be detected by the UE is the search space 1, and at this time the UE may perform the blind detection in accordance with this information. When the blind detection is performed unsuccessfully, the UE may try to perform the blind detection in accordance with another search space. When the detected 2-bit payload is 10, it means that the search space to be detected by the UE is the search space 2, and at this time the UE may perform the blind detection in accordance with this information. When the blind detection is performed unsuccessfully, the UE may try to perform the blind detection in accordance with another search space. When the detected 2-bit payload is 01, it means that the search space to be detected by the UE is the search space 3, and at this time the UE may perform the blind detection in accordance with this information. When the blind detection is performed unsuccessfully, the UE may try to perform the blind detection in accordance with another search space. When the detected 2-bit payload is 00, it is unnecessary for the UE to perform the blind detection on the paging signal or the PDCCH, and the UE may be maintained in the go-to-sleep state.

For yet another example, the payload detection result may correspond to the DCI format to be detected by the UE, so as to further reduce the power consumption for the UE during the blind detection on the PDCCH. The WUS or the go-to-sleep signal may be used to transmit a 2-bit payload. When the detected 2-bit payload is 11, it means that the DCI format to be detected by the UE is the DCI format 1, and at this time the UE may perform the blind detection in accordance with this information. When the blind detection is performed unsuccessfully, the UE may try to perform the blind detection in accordance with another DCI format. When the detected 2-bit payload is 10, it means that the DCI format to be detected by the UE is the DCI format 3, and at this time the UE may perform the blind detection in accordance with this information. When the blind detection is performed unsuccessfully, the UE may try to perform the blind detection in accordance with another DCI format. When the detected 2-bit payload is 01, it means that the DCI format to be detected by the UE is the DCI format 1 and the DCI format 3, and at this time the UE may perform the blind detection in accordance with this information. When the blind detection is performed unsuccessfully, the UE may try to perform the blind detection in accordance with another DCI format. When the detected 2-bit payload is 00, it is unnecessary for the UE to perform the blind detection on the paging signal or the PDCCH, and the UE may be maintained in the go-to-sleep state.

For still yet another example, the payload detection result may correspond to the bandwidth parts to be detected by the UE, so as to further reduce the power consumption for the UE during the blind detection on the PDCCH. The WUS or the go-to-sleep signal may be used to transmit a 2-bit payload. When the detected 2-bit payload is 11, it means that the bandwidth part to be detected by the UE is the bandwidth part 1, and at this time the UE may perform the blind detection in accordance with this information. When the blind detection is performed unsuccessfully, the UE may try to perform the blind detection in accordance with another bandwidth parts. When the detected 2-bit payload is 10, it means that the bandwidth parts to be detected by the UE is the bandwidth part 2, and at this time the UE may perform the blind detection in accordance with this information. When the blind detection is performed unsuccessfully, the UE may try to perform the blind detection in accordance with another bandwidth parts. When the detected 2-bit payload is 01, it means that the bandwidth parts to be detected by the UE is the bandwidth part 3, and at this time the UE may perform the blind detection in accordance with this information. When the blind detection is performed unsuccessfully, the UE may try to perform the blind detection in accordance with another bandwidth parts. When the detected 2-bit payload is 00, it is unnecessary for the UE to perform the blind detection on the paging signal or the PDCCH, and the UE may be maintained in the go-to-sleep state.

For still yet another example, the payload detection result may correspond to the time-frequency-domain resource to be detected by the UE, so as to further reduce the power consumption for the UE during the blind detection on the PDCCH. The WUS or the go-to-sleep signal may be used to transmit a 2-bit payload. When the detected 2-bit payload is 11, it means that the time-frequency-domain resource to be detected by the UE is a first OFDM symbol within a sub-frame where the WUS or go-to-sleep signal is located, and at this time the UE may perform the blind detection in accordance with this information. When the blind detection is performed unsuccessfully, the UE may try to perform the blind detection on another OFDM symbol (or another group of OFDM symbols). When the detected 2-bit payload is 10, it means that the time-frequency-domain resource to be detected by the UE is first two OFDM symbols within the sub-frame where the WUS or go-to-sleep signal is located, and at this time the UE may perform the blind detection in accordance with this information. When the blind detection is performed unsuccessfully, the UE may try to perform the blind detection on another OFDM symbol (or another group of OFDM symbols). When the detected 2-bit payload is 01, it means that the time-frequency-domain resource to be detected by the UE is first three OFDM symbols within the sub-frame where the WUS or go-to-sleep signal is located, and at this time the UE may perform the blind detection in accordance with this information. When the blind detection is performed unsuccessfully, the UE may try to perform the blind detection on another OFDM symbol (or another group of OFDM symbols). When the detected 2-bit payload is 00, it is unnecessary for the UE to perform the blind detection on the paging signal or the PDCCH, and the UE may be maintained in the go-to-sleep state.

For still yet another example, the payload detection result may correspond to the time interval between the PDCCH and the corresponding WUS or go-to-sleep signal, so as to further reduce the power consumption for the UE during the blind detection on the PDCCH. The WUS or the go-to-sleep signal may be used to transmit a 2-bit payload. When the detected 2-bit payload is 11, it means that the time interval between the PDCCH and the corresponding WUS or go-to-sleep signal to be detected by the UE is X ms. When the detected 2-bit payload is 10, it means that the time interval between the PDCCH and the corresponding WUS or go-to-sleep signal to be detected by the UE is Y ms. When the detected 2-bit payload is 01, it means that the time interval between the PDCCH and the corresponding WUS or go-to-sleep signal to be detected by the UE is Z ms. When the detected 2-bit payload is 00, it is unnecessary for the UE to perform the blind detection on the paging signal or the PDCCH, and the UE may be maintained in the go-to-sleep state.

For still yet another example, the payload detection result may correspond to a plurality of blind detection parameters (e.g., the aggregation level and the bandwidth parts), so as to further reduce the power consumption for the UE during the blind detection on the PDCCH. The WUS or the go-to-sleep signal may be used to transmit a 2-bit payload. When the detected 2-bit payload is 11, it means that the bandwidth parts to be detected by the UE is the bandwidth part 1 and the aggregation level is 1. When the detected 2-bit payload is 10, it means that the bandwidth part to be detected by the UE is the bandwidth part 1 and the aggregation level is 2. When the detected 2-bit payload is 01, it means that the bandwidth parts to be detected by the UE is the bandwidth part 2 and the aggregation level is 1. When the detected 2-bit payload is 00, it is unnecessary for the UE to perform the blind detection on the paging signal or the PDCCH, and the UE may be maintained in the go-to-sleep state.

In the embodiments of the present disclosure, through detecting the payload of the signal or channel, it is able to acquire the corresponding one or more blind detection parameters, thereby to increase the success rate of the blind detection, and reduce the power consumption for the UE.

In a possible embodiment of the present disclosure, the detecting the signal or the channel so as to acquire the detection result may include: detecting a sequence of the signals or the channels so as to acquire a detection sequence; and perform a channel decoding operation on a payload of the signal or the channel, so as to acquire a payload detection result. The acquiring the blind detection parameter corresponding to the detection result may include acquiring the blind detection parameter corresponding to the payload detection result.

The signals or the channels may represent to be transmitted in the form of the sequence in combination with the payload of the digital signal (i.e., sequence+payload of the digital signal). In addition, the sequence detection result and the payload detection result may be acquired. The description about the two detection results may refer to that mentioned hereinabove with a same beneficial effect, and thus will not be particularly defined herein.

In a possible embodiment of the present disclosure, the blind detection parameter acquisition method may further include: perform a synchronization operation using the detection sequence.

This step may be performed simultaneously with, or subsequent to, the step of detecting the signal or the channel so as to acquire the detection sequence, which will not be particularly defined herein.

The above-mentioned synchronization operation may refer to time synchronization, or any other synchronization between the UE and the base station, which will not be particularly defined herein. Through the synchronization operation, it is able to achieve the synchronization and acquire the blind detection parameter simultaneously in accordance with the signal or the channel, thereby to reduce the transmission of signaling and save the transmission resources.

In a possible embodiment of the present disclosure, the blind detection parameter may include at least one of an aggregation level of the PDCCH, a type of a search space of the PDCCH, a DCI format to be transmitted via the PDCCH, bandwidth parts occupied by the PDCCH, a time-frequency-domain resource occupied by the PDCCH, a time interval between the PDCCH and the WUS or the wake-up channel, and a time interval between the PDCCH and the go-to-sleep signal or the go-to-sleep channel.

The correspondence between the blind detection parameters and the detection results has been described hereinabove, and thus will not be particularly defined herein.

In the embodiments of the present disclosure, through the above-mentioned blind detection parameters, it is able to provide the WUS or the go-to-sleep signal corresponding to the one or more blind detection parameters, thereby to enable the UE to perform the blind detection on the PDCCH in a more accurate manner, increase the success rate of the blind detection, and further reduce the power consumption for the UE.

In a possible embodiment of the present disclosure, subsequent to acquiring the blind detection parameter corresponding to the detection result, the blind detection parameter acquisition method may further include Step 303 of performing the blind detection on the PDCCH by using the blind detection parameter.

Through Step 303, it is able to perform the blind detection on the PDCCH, so as to acquire a PDCCH signal from the base station, thereby to reduce the power consumption for the UE during the blind detection on the PDCCH.

In a possible embodiment of the present disclosure, the performing the blind detection on the PDCCH by using the blind detection parameter may include: performing the blind detection on the PDCCH in accordance with the aggregation level of the PDCCH; or performing the blind detection on the PDCCH in accordance with the type of the search space of the PDCCH; or performing the blind detection on the PDCCH in accordance with the DCI format; or performing the blind detection on the PDCCH in accordance with the bandwidth parts; or performing the blind detection on the PDCCH on the time-frequency-domain resource; or performing the blind detection on the PDCCH in accordance with the time interval between the PDCCH and the WUS; or performing the blind detection on the PDCCH in accordance with the time interval between the PDCCH and the go-to-sleep signal.

Here, the description has been given by taking one of the blind detection parameters as an example, and in the embodiments of the present disclosure, the blind detection may be performed in accordance with a plurality of blind detection parameters. For example, the blind detection may be performed on the PDCCH in accordance with the aggregation level of the PDCCH and the type of the search space of the PDCCH; or performing the blind detection on the PDCCH on the time-frequency-domain resource in the bandwidth parts; or performing the blind detection on the PDCCH in accordance with the DCI format on the time-frequency-domain resource in the bandwidth parts, which will not be particularly defined herein.

In the embodiments of the present disclosure, the UE may perform the blind detection in accordance with the blind detection parameter, so as to increase the success rate of the blind detection made by the UE on the PDCCH, and further reduce the power consumption for the UE.

In a possible embodiment of the present disclosure, subsequent to performing the blind detection on the PDCCH by using the blind detection parameter, the blind detection parameter acquisition method may further include, when the blind detection on the PDCCH fails, performing the blind detection on the PDCCH in accordance with any blind detection parameter other than the blind detection parameter.

The other blind detection parameter may be a blind detection parameter acquired by the UE in advance, or a blind detection parameter calculated or deduced in accordance with the blind detection parameter.

In the embodiments of the present disclosure, through the above step, it is able to further increase the success rate of the blind detection made by the UE on the PDCCH.

According to the embodiments of the present disclosure, the signal or the channel may be detected so as to acquire the detection result. Next, the blind detection parameter corresponding to the detection result may be acquired, the signal may include the WUS or the go-to-sleep signal, and the channel may include the wake-up channel or the go-to-sleep channel. Then, the blind detection may be performed on the PDCCH by using the blind detection parameter. As a result, it is able to reduce the power consumption for the UE during the blind detection on the PDCCH.

Figure 4:
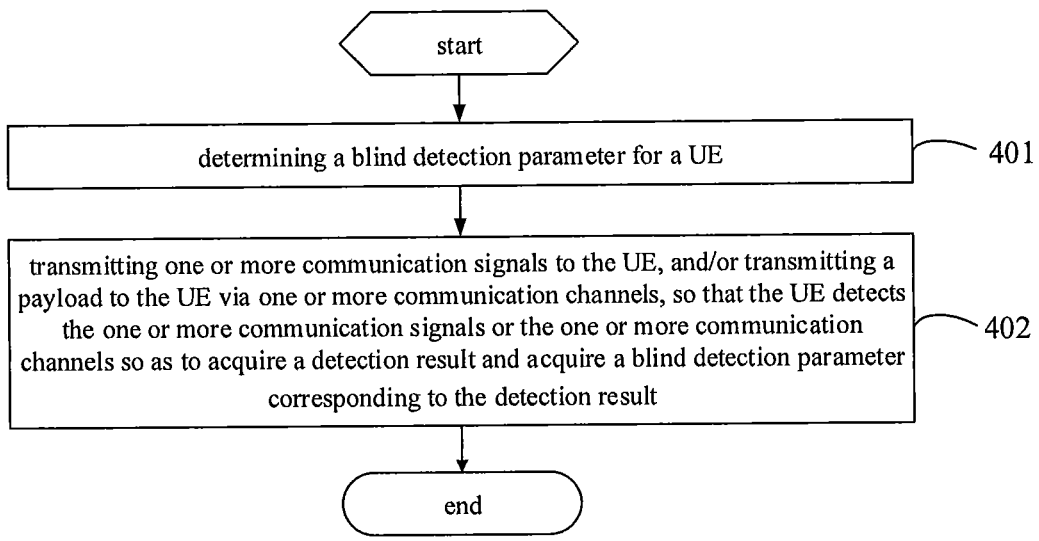
FIG. 4 is yet another flow chart of a blind detection parameter acquisition method according to one embodiment of the present disclosure.

The present disclosure further provides in some embodiments a blind detection parameter acquisition method which, as shown in FIG. 4, includes the following steps.

Step 401: determining a blind detection parameter of a UE.

The description about the blind detection parameter may refer to that mentioned in the embodiments as shown in FIGS. 2 and 3 with a same beneficial effect, and thus will not be particularly defined herein.

Step 402: transmitting a signal to the UE, and/or transmitting a payload to the UE via a channel, so that the UE detects the signal or the channel so as to acquire a detection result and acquire a blind detection parameter corresponding to the detection result.

The signal may include a WUS or a go-to-sleep signal, and the channel may include a wake-up channel or a go-to-sleep channel. The signal or the payload may correspond to the blind detection parameter.

The description about the detection result, the signal and the channel may refer to that mentioned in the embodiments as shown in FIGS. 2 and 3 with a same beneficial effect, and thus will not be particularly defined herein.

In a possible embodiment of the present disclosure, the blind detection parameter may include a blind detection parameter of a PDCCH.

The description about the blind detection parameter of the PDCCH may refer to that mentioned in the embodiments as shown in FIGS. 2 and 3 with a same beneficial effect, and thus will not be particularly defined herein.

In a possible embodiment of the present disclosure, the transmitting the signal to the UE and/or the transmitting the payload to the UE via the channel may include transmitting a signal corresponding to OOK to the UE in an OOK manner.

The description about the transmission mode may refer to that mentioned in the embodiments as shown in FIGS. 2 and 3 with a same beneficial effect, and thus will not be particularly defined herein.

In a possible embodiment of the present disclosure, the transmitting the signal corresponding to the OOK to the UE in an OOK manner may include transmitting the signal corresponding to the OOK to the UE on at least one resource unit in an OOK manner.

The description about the transmission mode may refer to that mentioned in the embodiments as shown in FIGS. 2 and 3 with a same beneficial effect, and thus will not be particularly defined herein.

In a possible embodiment of the present disclosure, the transmitting the signal to the UE and/or the transmitting the payload to the UE via the channel may include transmitting the signals to the UE in the form of an orthogonal sequence, a quasi-orthogonal sequence or a random sequence.

The description about the transmission mode may refer to that mentioned in the embodiments as shown in FIGS. 2 and 3 with a same beneficial effect, and thus will not be particularly defined herein.

In a possible embodiment of the present disclosure, the transmitting the signal to the UE and/or the transmitting the payload to the UE via the channel may include transmitting the payload to the UE via the channel in the form of a payload of an encoded digital signal.

The description about the transmission mode may refer to that mentioned in the embodiments as shown in FIGS. 2 and 3 with a same beneficial effect, and thus will not be particularly defined herein.

In a possible embodiment of the present disclosure, the transmitting the signal to the UE and/or the transmitting the payload to the UE via the channel may include transmitting the signal to the UE and transmitting the payload to the UE via the channel, and the signals may include a signal sequence.

The description about the transmission mode may refer to that mentioned in the embodiments as shown in FIGS. 2 and 3 with a same beneficial effect, and thus will not be particularly defined herein.

In a possible embodiment of the present disclosure, the signal sequence may be used for the synchronization operation performed by the UE, and the payload may be used to indicate the blind detection parameter.

The description about the synchronization operation may refer to that mentioned in the embodiments as shown in FIGS. 2 and 3 with a same beneficial effect, and thus will not be particularly defined herein.

In a possible embodiment of the present disclosure, the blind detection parameter may include at least one of an aggregation level of the PDCCH, a type of a search space of the PDCCH, a DCI format to be transmitted via the PDCCH, bandwidth parts occupied by the PDCCH, a time-frequency-domain resource occupied by the PDCCH, a time interval between the PDCCH and the WUS or the wake-up channel, and a time interval between the PDCCH and the go-to-sleep signal or the go-to-sleep channel.

The description about the blind detection parameter may refer to that mentioned in the embodiments as shown in FIGS. 2 and 3 with a same beneficial effect, and thus will not be particularly defined herein.

According to the embodiments of the present disclosure, the blind detection parameter of the UE may be determined, and then the signal may be transmitted to the UE or the signal may be transmitted to the UE via the channel, so that the UE detects the signal or the channel so as to acquire the detection result as well as the blind detection parameter corresponding to the detection result. The signal may include the WUS or the go-to-sleep signal, the channel may include the wake-up channel or the go-to-sleep channel, and the signal or the signal transmitted via the channel may correspond to the blind detection parameter. As a result, it is able to flexibly indicate the corresponding blind detection parameter to the UE, thereby to reduce the times of the blind detection operations as well as the power consumption for the UE.

Figure 5:
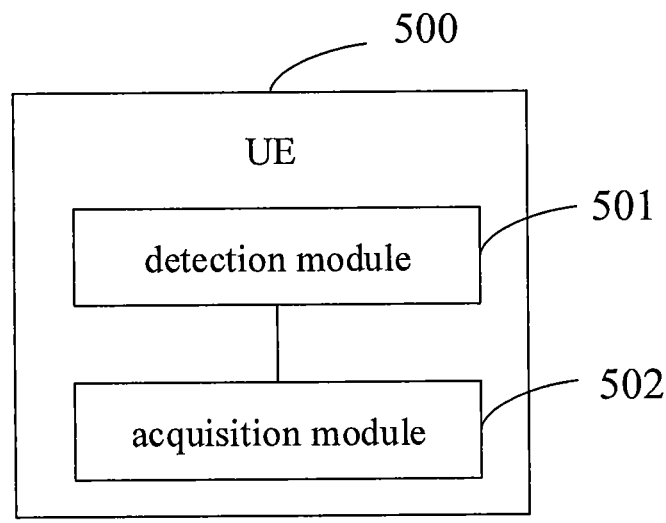
FIG. 5 is a schematic view showing a UE according to one embodiment of the present disclosure.

The present disclosure further provides in some embodiments a UE capable of implementing the blind detection parameter acquisition method in FIGS. 2 and 3 with a same technical effect. As shown in FIG. 5, the UE 500 may include a detection module 501 and an acquisition module 502, and the detection module 501 is connected to the acquisition module 502. The detection module 501 is configured to detect a signal or a channel to acquire a detection result. The acquisition module 502 is configured to acquire a blind detection parameter corresponding to the detection result. The signal includes a wake-up signal or a go-to-sleep signal, and the channel includes a wake-up channel or a go-to-sleep channel.

In a possible embodiment of the present disclosure, the blind detection parameter may include a blind detection parameter of a PDCCH.

In a possible embodiment of the present disclosure, the detection module 501 is further configured to detect a state of the signal or the channel so as to acquire a state detection result. The signal or the channel may be transmitted in an OKK manner.

Figure 6:
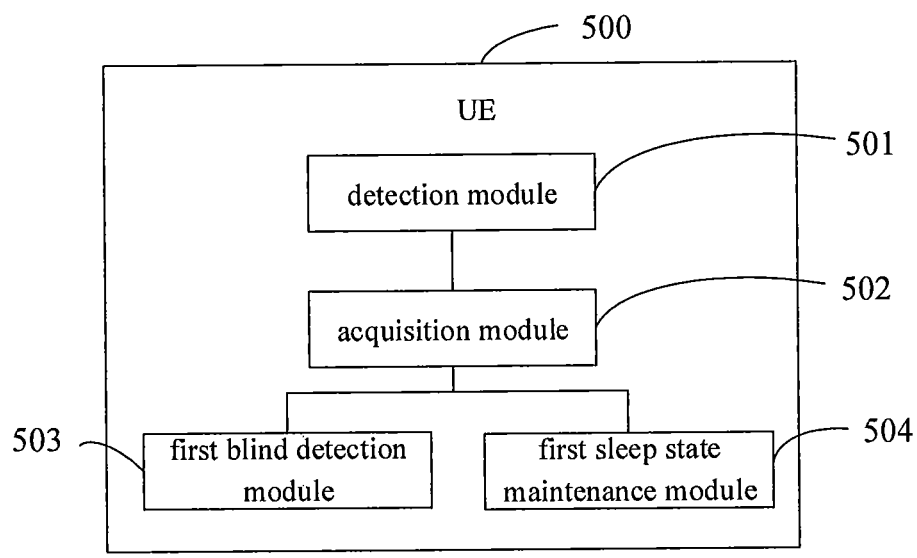
FIG. 6 is another schematic view showing the UE according to one embodiment of the present disclosure.

In a possible embodiment of the present disclosure, as shown in FIG. 6, the UE 500 may further include: a first blind detection module 503 configured to, when the state detection result indicates an on-state, perform the blind detection on the PDCCH; and a first go-to-sleep state maintenance module 504 configured to, when the state detection result indicates an off-state, maintain a go-to-sleep state.

In a possible embodiment of the present disclosure, the detection module 501 is further configured to detect the state of the signal or the channel on at least one resource unit so as to acquire the state detection result, and the state detection result may include a detection result acquired after performing state detection on the at least one resource unit. The acquisition module 502 is further configured to acquire a blind detection parameter corresponding to the state detection result and a detection-state corresponding to the state detection result, and the detection-state may include a wake-up state and the go-to-sleep state.

In a possible embodiment of the present disclosure, the detection module 501 is further configured to detect a sequence of the signals or the channels, so as to acquire a sequence detection result. The acquisition module 502 is further configured to acquire a blind detection parameter corresponding to the sequence detection result. The signals or the channels may be transmitted in the form of an orthogonal sequence, a quasi-orthogonal sequence or a random sequence.

Figure 7:
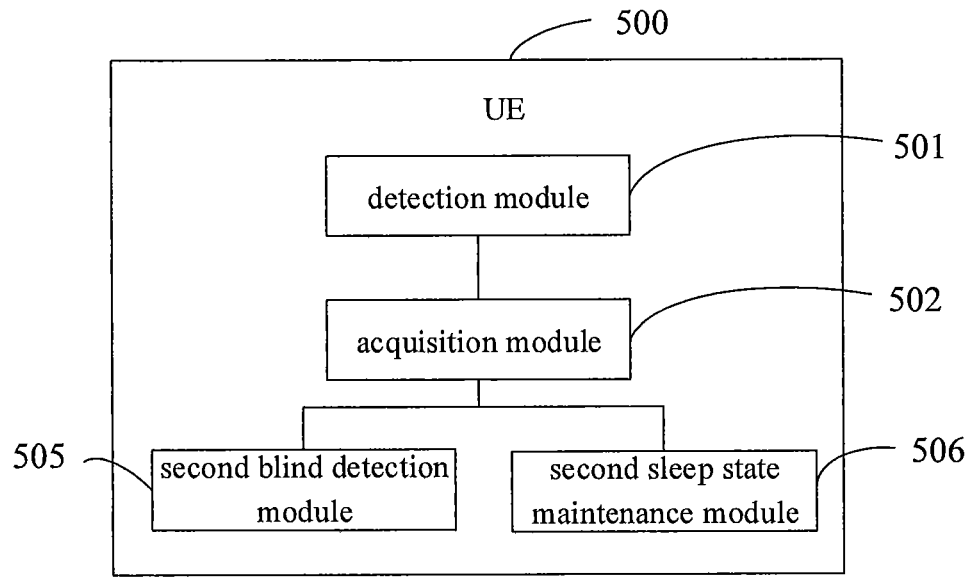
FIG. 7 is yet another schematic view showing the UE according to one embodiment of the present disclosure.

In a possible embodiment of the present disclosure, as shown in FIG. 7, the UE 500 may further include: a second blind detection module 505 configured to, when the sequence detection result indicates a predetermined sequence, perform the blind detection on the PDCCH; and a second go-to-sleep state maintenance module 506 configured to, when the sequence detection result does not indicate the predetermined sequence, maintain a go-to-sleep state.

In a possible embodiment of the present disclosure, the detection module 501 is further configured to perform a channel decoding operation on a payload of the signal or channel, so as to acquire a payload detection result. The acquisition module 502 is further configured to acquire the blind detection parameter corresponding to the payload detection result.

Figure 8:
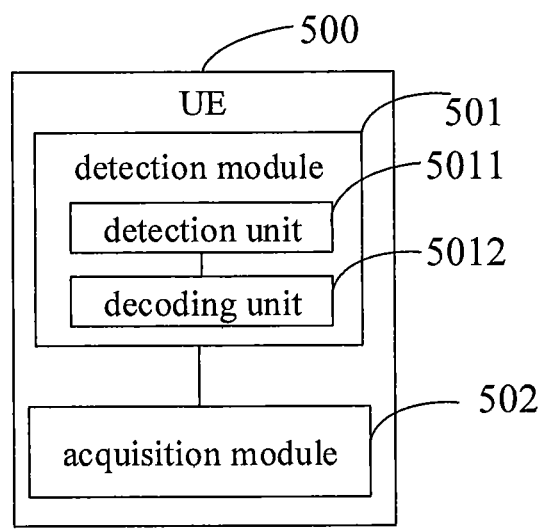
FIG. 8 is still yet another schematic view showing the UE according to one embodiment of the present disclosure.

In a possible embodiment of the present disclosure, as shown in FIG. 8, the detection module 501 may include: a detection unit 5011 configured to detect a sequence of the signals or the channels, so as to acquire a detection sequence; and a decoding unit 5012 configured to perform a channel decoding operation on the payload of the signal or the channel, so as to acquire a payload detection result. The acquisition module 502 is further configured to acquire the blind detection parameter corresponding to the payload detection result.

Figure 9:
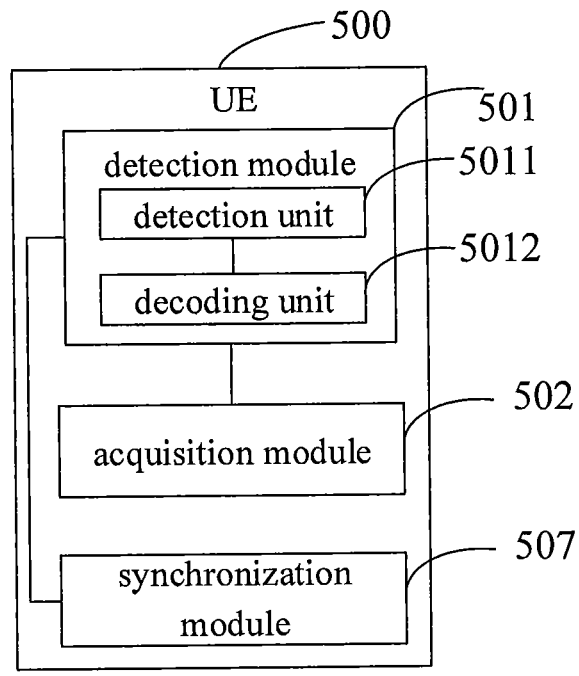
FIG. 9 is still yet another schematic view showing the UE according to one embodiment of the present disclosure.

In a possible embodiment of the present disclosure, as shown in FIG. 9, the UE 500 may further include a synchronization module 507 configured to perform a synchronization operation by using the detection sequence.

In a possible embodiment of the present disclosure, the blind detection parameter may include at least one of an aggregation level of the PDCCH, a type of a search space of the PDCCH, a DCI format to be transmitted via the PDCCH, bandwidth parts occupied by the PDCCH, a time-frequency-domain resource occupied by the PDCCH, a time interval between the PDCCH and the WUS or the wake-up channel, and a time interval between the PDCCH and the go-to-sleep signal or the go-to-sleep channel.

Figure 10:
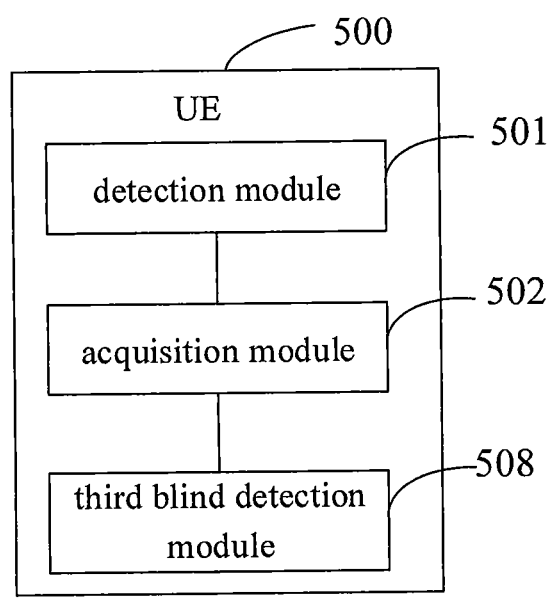
FIG. 10 is still yet another schematic view showing the UE according to one embodiment of the present disclosure.

In a possible embodiment of the present disclosure, as shown in FIG. 10, the UE 500 may further include a third blind detection module 508 configured to perform the blind detection on the PDCCH by using the blind detection parameter.

In a possible embodiment of the present disclosure, the third blind detection module 508 is further configured to: perform the blind detection on the PDCCH in accordance with the aggregation level of the PDCCH; or perform the blind detection on the PDCCH in accordance with the type of the search space of the PDCCH; or perform the blind detection on the PDCCH in accordance with the DCI format; or perform the blind detection on the PDCCH in accordance with the bandwidth parts; or perform the blind detection on the PDCCH on the time-frequency-domain resource; or perform the blind detection on the PDCCH in accordance with the time interval between the PDCCH and the WUS; or perform the blind detection on the PDCCH in accordance with the time interval between the PDCCH and the go-to-sleep signal.

Figure 11:
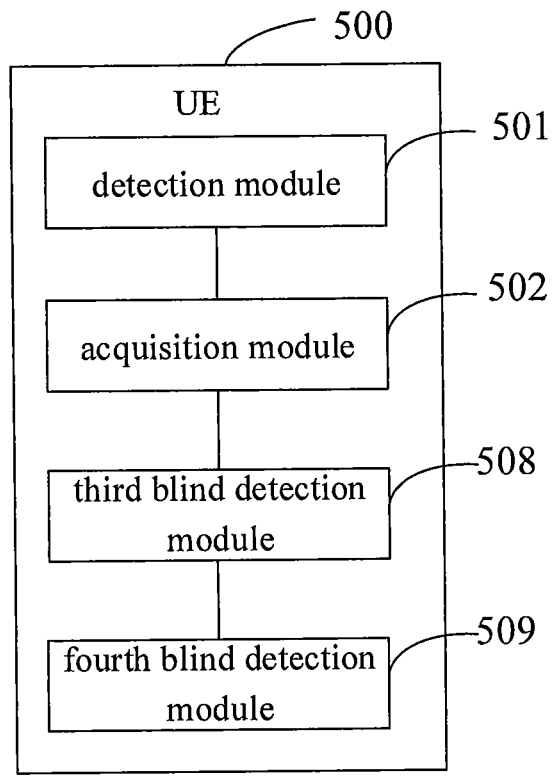
FIG. 11 is still yet another schematic view showing the UE according to one embodiment of the present disclosure.

In a possible embodiment of the present disclosure, as shown in FIG. 11, the UE 500 may further include a fourth blind detection module 509 configured to, when the blind detection on the PDCCH fails, perform the blind detection on the PDCCFH by using any blind detection parameter other than the blind detection parameter.

In the embodiments of the present disclosure, the signal or the channel may be detected so as to acquire the detection result, and then the blind detection parameter corresponding to the detection result may be acquired. The signal may include the WUS or the go-to-sleep signal, and the channel may include the wake-up channel or the go-to-sleep channel. As a result, it is able to flexibly acquire the blind detection parameter through the signal or channel, thereby to reduce the times of the blind detection operations, and reduce the power consumption for the UE.

Figure 12:
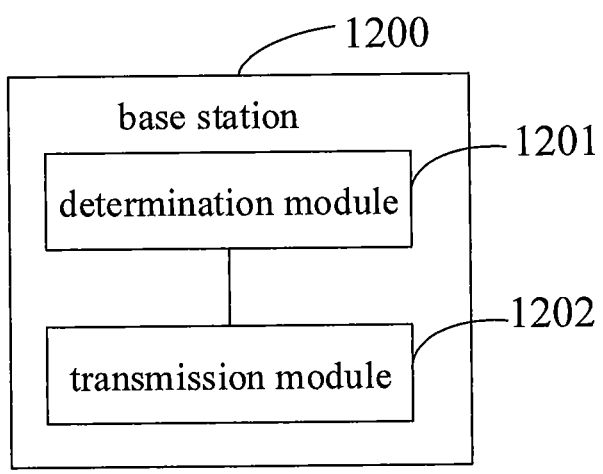
FIG. 12 is a schematic view showing a base station according to one embodiment of the present disclosure.

The present disclosure further provides in some embodiments a base station capable of implementing the blind detection parameter acquisition method in FIG. 4 with a same technical effect. As shown in FIG. 12, the base station 1200 includes a determination module 1201 and a transmission module 1202, and the determination module 1201 is connected to the transmission module 1202. The determination module 1201 is configured to determine a blind detection parameter of a UE. The transmission module 1202 is configured to transmit a signal to the UE and/or transmit a payload to the UE via a channel, so that the UE detects the signal or the channel to acquire a detection result and acquires the blind detection parameter corresponding to the detection result. The signal may include a wake-up signal or a go-to-sleep signal, and the channel may include a wake-up channel or a go-to-sleep channel. The signal or the payload transmitted via the channel may both correspond to the blind detection parameter.

In a possible embodiment of the present disclosure, the blind detection parameter may include a blind detection parameter of a PDCCH.

In a possible embodiment of the present disclosure, the transmission module 1202 is further configured to transmit a signal corresponding to OOK to the UE in an OOK manner.

In a possible embodiment of the present disclosure, the transmission module 1202 is further configured to transmit the signal corresponding to OOK to the UE on at least one resource unit in an OOK manner.

In a possible embodiment of the present disclosure, the transmission module 1202 is further configured to transmit the signal to the UE in the form of an orthogonal sequence, a quasi-orthogonal sequence or a random sequence.

In a possible embodiment of the present disclosure, the transmission module 1202 is further configured to transmit a payload to the UE via the channel in the form of a payload of an encoded digital signal.

In a possible embodiment of the present disclosure, the transmission module 1202 is further configured to transmit the signal to the UE, and transmit a payload to the UE via the channel. The signals may include a signal sequence.

In a possible embodiment of the present disclosure, the signal sequence is used for the synchronization operation performed by the UE, and the payload is used to indicate the blind detection parameter.

In a possible embodiment of the present disclosure, the blind detection parameter may include at least one of an aggregation level of the PDCCH, a type of a search space of the PDCCH, a DCI format to be transmitted via the PDCCH, bandwidth parts occupied by the PDCCH, a time-frequency-domain resource occupied by the PDCCH, a time interval between the PDCCH and the WUS or the wake-up channel, and a time interval between the PDCCH and the go-to-sleep signal or the go-to-sleep channel.

According to the embodiments of the present disclosure, the blind detection parameter for the UE may be determined, and then the signal may be transmitted to the UE or the signal may be transmitted to the UE via the channel, so that the UE detects the signal or the channel so as to acquire the detection result as well as the blind detection parameter corresponding to the detection result. The signal may include the WUS or the go-to-sleep channel, the channel may include the wake-up channel or the go-to-sleep channel, and the signal or the signal transmitted via the channel may correspond to the blind detection parameter. As a result, it is able to flexibly indicate the corresponding blind detection parameter to the UE, thereby to reduce the times of the blind detection operations as well as the power consumption for the UE.

The present disclosure further provides in some embodiments a UE, including a memory, a processor and a computer program stored in the memory and executed by the processor. The processor is configured to execute the computer program so as to implement the above-mentioned blind detection parameter acquisition method for the UE.

The present disclosure further provides in some embodiments a base station, including a memory, a processor and a computer program stored in the memory and executed by the processor. The processor is configured to execute the computer program so as to implement the above-mentioned blind detection parameter acquisition method for the base station.

The present disclosure further provides in some embodiments a computer-readable storage medium storing therein a computer program. The computer program is executed by a processor so as to implement the above-mentioned blind detection parameter acquisition method for the UE.

The present disclosure further provides in some embodiments a computer-readable storage medium storing therein a computer program. The computer program is executed by a processor so as to implement the above-mentioned blind detection parameter acquisition method for the base station.

Figure 13:
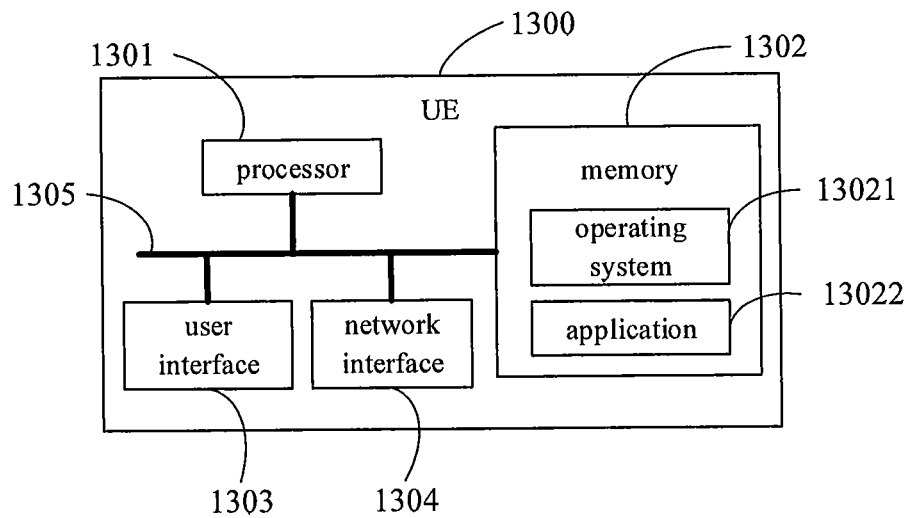
FIG. 13 is still yet another schematic view showing the UE according to one embodiment of the present disclosure.

The present disclosure further provides in some embodiments a UE capable of implementing the blind detection parameter acquisition method in FIGS. 2 and 3 with a same technical effect. As shown in FIG. 13, the UE 1300 includes at least one processor 1301, a memory 1302, at least one network interface 1304 and a user interface 1303. The components of the UE 1300 may be coupled together through a bus system 1305. It should be appreciated that, the bus system 1305 is configured to achieve connection and communication among the components. Apart from a data bus, the bus system 1305 may further include a power source bus, a control bus and a state signal bus. For clarification, all these buses in FIG. 13 may be collectively called as bus system 1305.

The user interface 1303 may include a display, a keyboard or a pointing device (e.g., mouse, track ball, touch plate or touch panel).

It should be appreciated that, the memory 1302 may be a volatile memory, a nonvolatile memory or both. The nonvolatile memory may be a Read-Only Memory (ROM), a Programmable ROM (PROM), an Erasable PROM (EPROM), an electrically EPROM (EEPROM) or a flash memory. The volatile memory may be a Random Access Memory (RAM) which serves as an external high-speed cache. Illustratively but not restrictively, the RAM may include Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM). The memory 1302 intends to include, but not limited to, the above-mentioned and any other appropriate memories.

In a possible embodiment of the present disclosure, the following elements may be stored in the memory 1302: an executable module or data structure, a subset or an extended set thereof, an operating system 13021 and an application 13022.

The operating system 13021 may include various system programs, e.g., a framework layer, a core layer and a driving layer, so as to implement various basic services and process hardware-based tasks. The application 13022 may include various applications, e.g., Media Player and Browser, so as to implement various application services. The programs for implementing the above-mentioned method may be included in the application 13022.

In the embodiments of the present disclosure, the UE 1300 may further include a computer program stored in the memory 1302 and executed by the processor 1301. The computer program is executed by the processor 1301 so as to: detect a signal or a channel to acquire a detection result;

and acquire a blind detection parameter corresponding to the detection result. The signal may include a wake-up signal or a go-to-sleep signal, and the channel may include a wake-up channel or a go-to-sleep channel.

The above-mentioned method may be applied to, or implemented by, the processor 1301. The processor 1301 may be an integrated circuit (IC) having a signal processing capability. During the implementation, the steps of the above-mentioned method may be completed through an integrated logic circuit of hardware in the processor 1301 or instructions in the form of software. The processor 1301 may be a general-purpose processor, a digital signal processor, an application-specific integrated circuit (ASIC), a field programmable gate array (FPGA) or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as an RAM, a flash memory, an ROM, a PROM, an EEPROM, or a register. The storage medium may be located in the memory 1302, and the processor 1301 may read information stored in the memory 1302 so as to implement the steps of the method in conjunction with the hardware.

It should be appreciated that, the embodiments of the present disclosure may be implemented by hardware, software, firmware, middleware, microcode or a combination thereof. For the hardware implementation, the processor may include one or more of an ASIC, a DSP, a DSP device (DSPD), a Programmable Logic Device (PLD), an FPGA, a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

In a possible embodiment of the present disclosure, the blind detection parameter may include a blind detection parameter of a PDCCH.

In a possible embodiment of the present disclosure, the processor 1301 is further configured to execute the computer program, so as to detect a state of the signal or the channel so as to acquire a state detection result. The signal or the channel may be transmitted in an OOK manner.

In a possible embodiment of the present disclosure, the processor 1301 is further configured to execute the computer program, so as to, when the state detection result indicates an on-state, perform the blind detection on the PDCCH, and when the state detection result indicates an off-state, maintain a go-to-sleep state.

In a possible embodiment of the present disclosure, the processor 1301 is further configured to execute the computer program, so as to: detect the state of the signal or the channel on at least one resource unit to acquire the state detection result, the state detection result including a detection result acquired after performing state detection on the at least one resource unit; and acquire a blind detection parameter corresponding to the state detection result and a detection-state corresponding to the state detection result, the detection-state including a wake-up state and the go-to-sleep state.

In a possible embodiment of the present disclosure, the processor 1301 is further configured to execute the computer program, so as to: detect a sequence of the signals or the channels to acquire a sequence detection result; and acquire a blind detection parameter corresponding to the sequence detection result. The signals or the channels may be transmitted in the form of an orthogonal sequence, a quasi-orthogonal sequence or a random sequence.

In a possible embodiment of the present disclosure, the processor 1301 is further configured to execute the computer program, so as to, when the sequence detection result indicates a predetermined sequence, perform the blind detection on the PDCCH, and when the sequence detection result does not indicate the predetermined sequence, maintain a go-to-sleep state.

In a possible embodiment of the present disclosure, the processor 1301 is further configured to execute the computer program, so as to perform a channel decoding operation on a payload of the signal or channel to acquire a payload detection result, and acquire the blind detection parameter corresponding to the payload detection result.

In a possible embodiment of the present disclosure, the processor 1301 is further configured to execute the computer program, so as to: detect a sequence of the signals or channels to acquire a detection sequence; perform a channel decoding operation on the payload of the signal or the channel to acquire a payload detection result; and acquire the blind detection parameter corresponding to the payload detection result.

In a possible embodiment of the present disclosure, the processor 1301 is further configured to execute the computer program, so as to perform the synchronization operation by using the detection sequence.

In a possible embodiment of the present disclosure, the blind detection parameter may include at least one of an aggregation level of the PDCCH, a type of a search space of the PDCCH, a DCI format to be transmitted via the PDCCH, bandwidth parts occupied by the PDCCH, a time-frequency-domain resource occupied by the PDCCH, a time interval between the PDCCH and the WUS or the wake-up channel, and a time interval between the PDCCH and the go-to-sleep signal or the go-to-sleep channel.

In a possible embodiment of the present disclosure, the processor 1301 is further configured to execute the computer program, so as to perform the blind detection on the PDCCH by using the blind detection parameter.

In a possible embodiment of the present disclosure, the processor 1301 is further configured to execute the computer program, so as to: perform the blind detection on the PDCCH in accordance with the aggregation level of the PDCCH; or perform the blind detection on the PDCCH in accordance with the type of the search space of the PDCCH; or perform the blind detection on the PDCCH in accordance with the DCI format; or perform the blind detection on the PDCCH in accordance with the bandwidth parts; or perform the blind detection on the PDCCH on the time-frequency-domain resource; or perform the blind detection on the PDCCH in accordance with the time interval between the PDCCH and the WUS; or perform the blind detection on the PDCCH in accordance with the time interval between the PDCCH and the go-to-sleep signal.

In a possible embodiment of the present disclosure, the processor 1301 is further configured to execute the computer program, so as to, when the blind detection on the PDCCH fails, perform the blind detection on the PDCCFH by using any blind detection parameter other than the blind detection parameter.

In the embodiments of the present disclosure, the one or more signal or the one or more channel may be detected so as to acquire the detection result, and then the blind detection parameter corresponding to the detection result may be acquired. The signal may include the WUS or the go-to-sleep signal, and the channel may include the wake-up channel or the go-to-sleep channel. As a result, it is able to flexibly acquire the blind detection parameter through the signal or channel, thereby to reduce the times of the blind detection operations, and reduce the power consumption for the UE.

Figure 14:
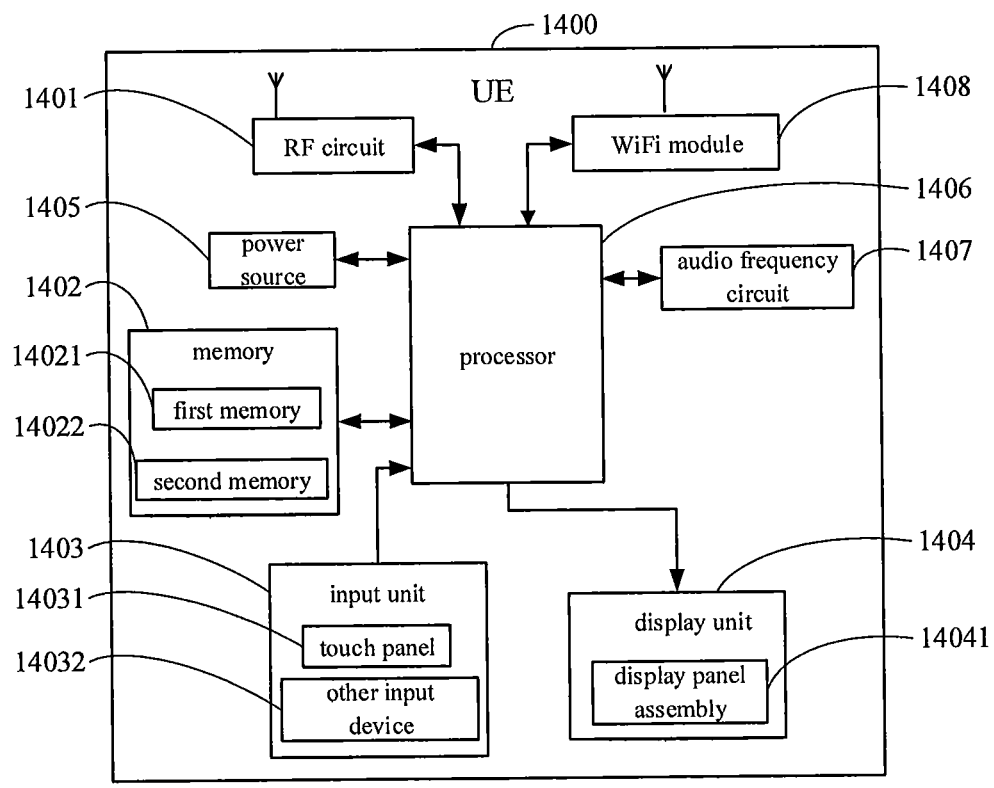
FIG. 14 is still yet another schematic view showing the UE according to one embodiment of the present disclosure.

The present disclosure further provides in some embodiments a UE capable of implementing the above-mentioned blind detection parameter acquisition method in FIGS. 2 and 3 with a same technical effect. As shown in FIG. 14, the UE 1400 includes a Radio Frequency (RF) circuit 1401, a memory 1402, an input unit 1403, a display unit 1404, a power source 1405, a processor 1406, an audio frequency circuit 1407 and a Wireless Fidelity (WiFi) module 1408.

The input unit 1403 is configured to receive digital or character information inputted by a user, and generate a signal input related to user settings and function control of the UE 1400. To be specific, the input unit 1403 may include a touch panel 14031. The touch panel 14031, also called as touch screen, is configured to collect a touch operation made by the user on or in proximity to the touch panel (e.g., an operation made by the user through any appropriate object or attachment (e.g., finger or stylus) on or in the proximity to the touch panel 14031), and drive a corresponding connection device in accordance with a predetermined program. The touch panel 14031 may include a touch detection unit and a touch controller. The touch detection unit is configured to detect a touch position and a signal generated due to the touch operation, and transmit the signal to the touch controller. The touch controller is configured to receive touch information from the touch detection unit, convert it into coordinates of a touch point, transmit the coordinates to the processor 1406, and receive and execute a command from the processor 1406. In addition, the touch panel 14031 may be of a resistive type, a capacitive type, an infrared type or a surface acoustic wave (SAW) type. Apart from the touch panel 14031, the input unit 1403 may further include an input device 14032 which may include, but not limited to, a physical keyboard, a functional button (e.g., a volume control button or an on/off button), a trackball, a mouse, and a joystick, which will not be particularly defined herein.

The display unit 1404 is configured to display information inputted by the user or information to be presented to the user, and various interfaces for the UE 1400, and it may include a display panel 14041. In a possible embodiment of the present disclosure, the display panel 14041 may be a Liquid Crystal Display (LCD) panel or an Organic Light-Emitting Diode (OLED) panel.

It should be appreciated that, the touch panel 14031 may cover the display panel 14041, so as to form a touch display panel. When the touch operation made on or in proximity to the touch display panel has been detected, the touch information may be transmitted to the processor 1406 so as to determine a type of a touch event. Then, the processor 1406 may provide corresponding visual output on the touch display panel in accordance with the type of the touch event. The touch display panel may include an application interface display region and a commonly-used controls display region. An arrangement mode of the two display regions will not be particularly defined herein, e.g., one of the two display regions may be arranged above or under the other, or arranged to the left or the right of the other. The application interface display region may be adopted to display interfaces for applications, and each interface may include an icon for at least one application and/or an interface element such as Widget desktop control. The application interface display region may also be a blank interface where no content is contained. The commonly-used controls display region may be adopted to display controls which are used frequently, e.g., setting button, interface number, scroll bar, or such application icons as telephone book icon.

The processor 1406 may be a control center of the UE 1400, and connected to each member of the entire UE via various interfaces and lines. The processor 1406 is configured to run or execute software programs and/or modules stored in a first memory 14021, and call data stored in a second memory 14022, so as to achieve various functions of the UE 1400 and process the data, thereby to monitor the UE 1400. In a possible embodiment of the present disclosure, the processor 1406 may include one or more processing units.

In the embodiments of the present disclosure, through calling a software program and/or a module stored in the first memory 14021 and/or the data stored in the second memory 14022, the processor 1046 is configured to: detect a signal or a channel to acquire a detection result; and acquire a blind detection parameter corresponding to the detection result. The signal may include a wake-up signal or a go-to-sleep signal, and the channel may include a wake-up channel or a go-to-sleep channel.

In a possible embodiment of the present disclosure, the blind detection parameter may include a blind detection parameter of a PDCCH.

In a possible embodiment of the present disclosure, the processor 1406 is further configured to call the software program and/or module stored in the first memory 14021 and the data stored in the second memory 14022, so as to: detect a state of the signal or the channel so as to acquire a state detection result. The signal or the channel may be transmitted in an OOK manner.

In a possible embodiment of the present disclosure, the processor 1406 is further configured to call the software program and/or module stored in the first memory 14021 and the data stored in the second memory 14022, so as to when the state detection result indicates an on-state, perform the blind detection on the PDCCH, and when the state detection result indicates an off-state, maintain a go-to-sleep state.

In a possible embodiment of the present disclosure, the processor 1406 is further configured to call the software program and/or module stored in the first memory 14021 and the data stored in the second memory 14022, 50 as to: detect the state of the signal or the channel on at least one resource unit to acquire the state detection result, the state detection result including a detection result acquired after performing state detection on the at least one resource unit; and acquire a blind detection parameter corresponding to the state detection result and a detection-state corresponding to the state detection result, the detection-state including a wake-up state and the go-to-sleep state.

In a possible embodiment of the present disclosure, the processor 1406 is further configured to call the software program and/or module stored in the first memory 14021 and the data stored in the second memory 14022, so as to:

detect a sequence of the signals or the channels to acquire a sequence detection result; and acquire a blind detection parameter corresponding to the sequence detection result. The signal or the channel may be transmitted in the form of an orthogonal sequence, a quasi-orthogonal sequence or a random sequence.

In a possible embodiment of the present disclosure, the processor 1406 is further configured to call the software program and/or module stored in the first memory 14021 and the data stored in the second memory 14022, so as to, when the sequence detection result indicates a predetermined sequence, perform the blind detection on the PDCCH, and when the sequence detection result does not indicate the predetermined sequence, maintain a go-to-sleep state.

In a possible embodiment of the present disclosure, the processor 1406 is further configured to call the software program and/or module stored in the first memory 14021 and the data stored in the second memory 14022, so as to perform a channel decoding operation on a payload of the signal or channel to acquire a payload detection result, and acquire the blind detection parameter corresponding to the payload detection result.

In a possible embodiment of the present disclosure, the processor 1406 is further configured to call the software program and/or module stored in the first memory 14021 and the data stored in the second memory 14022, so as to: detect a sequence of the signals or channels to acquire a detection sequence; perform a channel decoding operation on the payload of the signal or the channel to acquire a payload detection result; and acquire the blind detection parameter corresponding to the payload detection result.

In a possible embodiment of the present disclosure, the processor 1406 is further configured to call the software program and/or module stored in the first memory 14021 and the data stored in the second memory 14022, so as to perform the synchronization operation by using the detection sequence.

In a possible embodiment of the present disclosure, the blind detection parameter may include at least one of an aggregation level of the PDCCH, a type of a search space of the PDCCH, a DCI format to be transmitted via the PDCCH, bandwidth parts occupied by the PDCCH, a time-frequency-domain resource occupied by the PDCCH, a time interval between the PDCCH and the WUS or the wake-up channel, and a time interval between the PDCCH and the go-to-sleep signal or the go-to-sleep channel.

In a possible embodiment of the present disclosure, the processor 1406 is further configured to call the software program and/or module stored in the first memory 14021 and the data stored in the second memory 14022, so as to perform the blind detection on the PDCCH by using the blind detection parameter.

In a possible embodiment of the present disclosure, the processor 1406 is further configured to call the software program and/or module stored in the first memory 14021 and the data stored in the second memory 14022, so as to: perform the blind detection on the PDCCH in accordance with the aggregation level of the PDCCH; or perform the blind detection on the PDCCH in accordance with the type of the search space of the PDCCH; or perform the blind detection on the PDCCH in accordance with the DCI format; or perform the blind detection on the PDCCH in accordance with the bandwidth parts; or perform the blind detection on the PDCCH on the time-frequency-domain resource; or perform the blind detection on the PDCCH in accordance with the time interval between the PDCCH and the WUS; or perform the blind detection on the PDCCH in accordance with the time interval between the PDCCH and the go-to-sleep signal.

In a possible embodiment of the present disclosure, the processor 1406 is further configured to call the software program and/or module stored in the first memory 14021 and the data stored in the second memory 14022, so as to, when the blind detection on the PDCCH fails, perform the blind detection on the PDCCH by using any blind detection parameter other than the blind detection parameter.

In the embodiments of the present disclosure, the signal or the channel may be detected so as to acquire the detection result, and then the blind detection parameter corresponding to the detection result may be acquired. The signal may include the WUS or the go-to-sleep signal, and the channel may include the wake-up channel or the go-to-sleep channel. As a result, it is able to flexibly acquire the blind detection parameter through the signal or channel, thereby to reduce the times of the blind detection operations, and reduce the power consumption for the UE.

Figure 15:
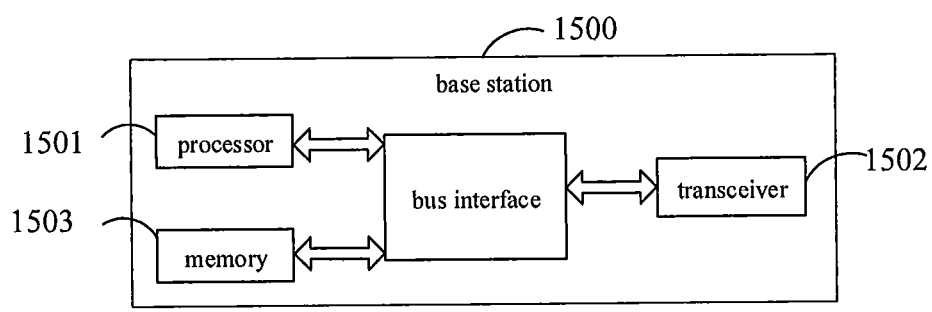
FIG. 15 is another schematic view showing the base station according to one embodiment of the present disclosure.

The present disclosure further provides in some embodiments a base station capable of implementing the blind detection parameter acquisition method in FIG. 4 with a same technical effect. As shown in FIG. 15, the base station 1500 includes a processor 1501, a transceiver 1502, a memory 1503 and a bus interface.

In the embodiments of the present disclosure, the base station 1500 may further include a computer program stored in the memory 1503 and executed by the processor 1501. The processor 1501 is configured to execute the computer program so as to: determine a blind detection parameter of a UE; and transmit a signal to the UE or transmitting a payload to the UE via a channel, so that the UE detects the signal or the channel to acquire a detection result and acquires the blind detection parameter corresponding to the detection result. The signal may include a wake-up signal or a go-to-sleep signal, and the channel may include a wake-up channel or a go-to-sleep channel. The signal or the payload may both correspond to the blind detection parameter.

The transceiver 1502 is configured to receive and transmit data under the control of the processor 1501. The transceiver 1502 may include at least two antenna ports.

In FIG. 15, bus architecture may include a number of buses and bridges connected to each other, so as to connect various circuits for one or more processors 1501 and one or more memories 1503. In addition, as is known in the art, the bus architecture may be used to connect any other circuits, such as a circuit for a peripheral device, a circuit for a voltage stabilizer and a power management circuit. The bus interface may be provided, and the transceiver 1502 may consist of a plurality of elements, i.e., a transmitter and a receiver for communication with any other devices over a transmission medium. With respect to different UEs, a user interface 1504 may also be provided for devices which are to be arranged inside or outside the UE, and these devices may include but not limited to a keypad, a display, a speaker, a microphone and a joystick. The processor 1501 may take charge of managing the bus architecture as well as general processing. The memory 1503 may store therein data for the operation of the processor 1501.

In a possible embodiment of the present disclosure, the blind detection parameter may include a blind detection parameter of a PDCCH.

In a possible embodiment of the present disclosure, the processor 1501 is further configured to execute the computer program, so as to transmit the signal to the UE or transmit the signal to the UE via the channel in an OOK manner.

In a possible embodiment of the present disclosure, the processor 1501 is further configured to execute the computer program, so as to transmit a signal corresponding to OOK to the UE on at least one resource unit in an OOK manner.

In a possible embodiment of the present disclosure, the processor 1501 is further configured to execute the computer program, so as to transmit the signal to the UE in the form of an orthogonal sequence, a quasi-orthogonal sequence or a random sequence.

In a possible embodiment of the present disclosure, the processor 1501 is further configured to execute the computer program, so as to transmit a payload to the UE via the channel in the form of a payload of an encoded digital signal.

In a possible embodiment of the present disclosure, the processor 1501 is further configured to execute the computer program, so as to transmit the signal to the UE, and transmit a payload to the UE via the channel. The signals may include a signal sequence.

In a possible embodiment of the present disclosure, the signal sequence is used for synchronization performed by the UE, and the payload is used to indicate the blind detection parameter.

In a possible embodiment of the present disclosure, the blind detection parameter may include at least one of an aggregation level of the PDCCH, a type of a search space of the PDCCH, a DCI format to be transmitted via the PDCCH, bandwidth parts occupied by the PDCCH, a time-frequency-domain resource occupied by the PDCCH, a time interval between the PDCCH and the WUS or the wake-up channel, and a time interval between the PDCCH and the go-to-sleep signal or the go-to-sleep channel.

According to the embodiments of the present disclosure, the blind detection parameter of the UE may be determined, and then the signal may be transmitted to the UE or the signal may be transmitted to the UE via the channel, so that the UE detects the signal or the channel so as to acquire the detection result as well as the blind detection parameter corresponding to the detection result. The signal may include the WUS or the go-to-sleep signal, the channel may include the wake-up channel or the go-to-sleep channel, and the signal or the signal transmitted via the channel may correspond to the blind detection parameter. As a result, it is able to flexibly indicate the corresponding blind detection parameter to the UE, thereby to reduce the times of the blind detection operations and save the power consumption for the UE.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the apparatus is merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A blind detection parameter acquisition method applied for a User Equipment (UE), comprising:
   detecting a signal or a channel to acquire a detection result; and
   acquiring a blind detection parameter corresponding to the detection result,
   wherein the signal comprises a wake-up signal or a go-to-sleep signal, and the channel comprises a wake-up channel or a go-to-sleep channel;
   wherein the detecting signal or a channel so as to acquire the detection result comprises: detecting a state of the signal or the channel, so as to acquire a state detection result, wherein the signal or the channel is transmitted in an On-Off-Keying (OOK) manner;
   or,
   detecting a sequence of signals or channels, so as to acquire a sequence detection result, wherein the signals or the channels are transmitted in the form of an orthogonal sequence, a quasi-orthogonal sequence or a random sequence;
   or,
   performing a channel decoding operation on a payload of the signal or the channel so as to acquire a payload detection result;

or,
   detecting a sequence of signals or channels, so as to acquire a sequence detection result, and performing a channel decoding operation on a payload of the signal or the channel in accordance with the sequence detection result, so as to acquire a payload detection result.

2. The blind detection parameter acquisition method according to claim 1, wherein subsequent to detecting the state of the signal or the channel so as to acquire the state detection result, the blind detection parameter acquisition method further comprises:
   when the state detection result indicates an on-state, performing the blind detection on a Physical Downlink Control Channel (PDCCH); and
   when the state detection result indicates an off-state, maintaining a go-to-sleep state.

3. The blind detection parameter acquisition method according to claim 1, wherein the detecting the state of the signal or the channel so as to acquire the state detection result comprises: detecting the state of the signal or the channel on at least one resource unit, so as to acquire the state detection result, wherein the state detection result comprises a detection result acquired by performing state detection on the at least one resource unit,
   wherein the acquiring the blind detection parameter corresponding to the detection result comprises: acquiring a blind detection parameter corresponding to the state detection result and a detection-state corresponding to the state detection result, wherein the detection-state comprises a wake-up state and the go-to-sleep state.

4. The blind detection parameter acquisition method according to claim 1, wherein
   the acquiring the blind detection parameter corresponding to the detection result comprises:
   acquiring the blind detection parameter corresponding to the sequence detection result; or,
   acquiring the blind detection parameter corresponding to the payload detection result.

5. The blind detection parameter acquisition method according to claim 1, wherein subsequent to detecting the sequence of signals or channels so as to acquire the sequence detection result, the blind detection parameter acquisition method further comprises:
   when the sequence detection result indicates a predetermined sequence, performing the blind detection on the PDCCH; and
   when the sequence detection result does not indicate the predetermined sequence, maintaining a go-to-sleep state.

6. The Hind detection parameter acquisition method according to claim 1, further comprising performing a synchronization operation by using the detection sequence.

7. The blind detection parameter acquisition method according to claim 1, wherein the blind detection parameter comprises at least one of an aggregation level of the PDCCH, a type of a search space of the PDCCH, a Downlink Control Information (DCI) format to be transmitted via the PDCCH, bandwidth parts occupied by the PDCCH, a time-frequency-domain resource occupied by the PDCCH, a time interval between the PDCCH and the wake-up signal or the wake-up channel, and a time interval between the PDCCH and the go-to-sleep signal or the go-to-sleep channel.

8. The blind detection parameter acquisition method according to claim 7, wherein subsequent to acquiring the blind detection parameter corresponding to the detection result, the blind detection parameter acquisition method further comprises performing the blind detection on the PDCCH by using the blind detection parameter.

9. The blind detection parameter acquisition method according to claim 8, wherein the performing the blind detection on the PDCCH by using the blind detection parameter comprises:
   performing the blind detection on the PDCCH in accordance with the aggregation level of the PDCCH; or
   performing the blind detection on the PDCCH in accordance with the type of the search space of the PDCCH; or
   performing the blind detection on the PDCCH in accordance with the DCI format; or
   performing the blind detection on the PDCCH in accordance with the bandwidth parts; or
   performing the blind detection on the PDCCH on the time-frequency-domain resource; or
   performing the blind detection on the PDCCH in accordance with the time interval between the PDCCH and the WUS; or
   performing the blind detection on the PDCCH in accordance with the time interval between the PDCCH and the go-to-sleep signal.

10. The blind detection parameter acquisition method according to claim 8, wherein subsequent to performing the blind detection on the PDCCH by using the blind detection parameter, the blind detection parameter acquisition method further comprises, when the blind detection on the PDCCH fails, performing the blind detection on the PDCCH by using blind detection parameters other than the blind detection parameter.

11. A blind detection parameter acquisition method applied for a base station, comprising:
   determining a blind detection parameter of a UE; and
   transmitting a signal to the UE or transmitting a payload to the UE via a channel, so that the UE detects the signal or the channel to acquire a detection result and acquires the blind detection parameter corresponding to the detection result,
   wherein the signal comprises a wake-up signal or a go-to-sleep signal, the channel comprises a wake-up channel or a go-to-sleep channel, and the signal or the payload both correspond to the blind detection parameter;
   wherein the transmitting the signal to the UE and/or transmitting the payload to the UE via the channel compromises:
   transmitting an OOK signal to the UE in an OOK manner; or,
   transmitting the signal payload to the UE, wherein the signal comprise a signal sequence, and the signal sequence comprises on orthogonal sequence, a quasi-orthogonal sequence or a random sequence; or,
   transmitting to the UE via the channel in the form of a payload of an encoded digital signal.

12. The blind detection parameter acquisition method according to claim 11, wherein the transmitting the On-Off-Keying (OOK) signal to the UE in an OOK manner comprises transmitting the OOK signal to the UE in an OOK manner on at least one resource unit.

13. The blind detection parameter acquisition method according to claim 11, wherein the signal sequence is used for the synchronization operation performed by the UE, and the payload is used to indicate the blind detection parameter.

14. The blind detection parameter acquisition method according to claim 11, wherein the blind detection parameter comprises at least one of an aggregation level of the PDCCH, a type of a search space of the PDCCH, a DCI format to be transmitted via the PDCCH, bandwidth parts occupied by the PDCCH, a time-frequency-domain resource occupied by the PDCCH, a time interval between the PDCCH and the wake-up signal or the wake-up channel, and a time interval between the PDCCH and the go-to-sleep signal or the go-to-sleep channel.

15. A UE, comprising a memory, a processor and a computer program stored in the memory and executed by the processor, wherein the processor is configured to execute the computer program so as to implement a blind detection parameter acquisition method comprising:
  detecting a signal or a channel to acquire a detection result; and
  acquiring a blind detection parameter corresponding to the detection result,
  wherein the signal comprises a wake-up signal or a go-to-sleep signal, and the channel comprises a wake-up channel or a go-to-sleep channel;
  wherein the detecting a signal or a channel so as to acquire the detection result comprises:
  detecting a state of the signal or the channel, so as to acquire a state detection result, wherein the signal or the channel is transmitted in an On-Off-Keying (OOK) manner;
  or,
  detecting a sequence of signals or channels, so as to acquire a sequence detection result, wherein the signals or the channels are transmitted in the form of an orthogonal sequence; a quasi-orthogonal sequence or a random sequence;
  or,
  performing a channel decoding operation on a payload of the signal or the channel so as to acquire a payload detection result;
  or,
  detecting a sequence of signals or channels, so as to acquire a sequence detection result, and performing a channel decoding operation on a payload of the signal or the channel in accordance with the sequence detection result, so as to acquire a payload detection result.

16. The DE according to claim 15, wherein subsequent to detecting the state of the signal or the channel so as to acquire the state detection result, the blind detection parameter acquisition method further comprises:
  when the state detection result indicates an on-state, performing the blind detection on a Physical Downlink Control Channel (PDCCH); and
  when the state detection result indicates an off-state, maintaining a go-to-sleep state.

17. The UE according to claim 15, wherein the detecting the state of the signal or the channel so as to acquire the state detection result comprises: detecting the state of the signal or the channel on at least one resource unit, so as to acquire the state detection result, wherein the state detection result comprises a detection result acquired by performing state detection on the at least one resource unit,
  wherein the acquiring the blind detection parameter corresponding to the detection result comprises: acquiring a blind detection parameter corresponding to the state detection result and a detection-state corresponding to the state detection result, wherein the detection-state comprises a wake-up state and the go-to-sleep state.

18. The UE according to claim 15, wherein subsequent to detecting the sequence of signals or channels so as to acquire the sequence detection result, the blind detection parameter acquisition method further comprises:
  when the sequence detection result indicates a predetermined sequence, performing the blind detection on the PDCCH; and
  when the sequence detection result does not indicate the predetermined sequence, maintaining a go-to-sleep state.

19. The UE according to claim 15, the blind detection parameter acquisition method further comprises performing a synchronization operation by using the detection sequence.

20. A base station, comprising a memory, a processor and a computer program stored in the memory and executed by the processor, wherein the processor is configured to execute the computer program so as to implement a blind detection parameter acquisition method comprising:
  determining a blind detection parameter of a UE; and
  transmitting a signal to the UE or transmitting a payload to the UE via a channel, so that the UE detects the signal or the channel to acquire a detection result and acquires the blind detection parameter corresponding to the result,
  wherein the signal comprises a wake-up signal or a go-to-sleep signal, the channel comprises a wake-up channel or a go-to-sleep channel, and the signal or the payload both correspond to the blind detection parameter;
  wherein the transmitting the signal to the UE and/or transmitting the payload to the UE via the channel comprises:
  transmitting a OOK signal to the UE in an OOK manner;
  or,
  transmitting the signal to the UE, wherein the signal comprise a signal sequence, and the signal sequence comprises an orthogonal sequence, a quasi-orthogonal sequence or a random sequence;
  or,
  transmitting the payload to the UE via the channel in the form of a payload of an encoded digital signal.

* * * * *